United States Patent
Koh et al.

(10) Patent No.: US 11,301,830 B2
(45) Date of Patent: *Apr. 12, 2022

(54) SYSTEM, DEVICE, AND METHOD FOR CAPTURING AND MANAGING POINT OF SALE TRANSACTION RELATED DATA

(71) Applicant: APTUS Business Logic PTE Ltd., Singapore (SG)

(72) Inventors: Tze Wei Koh, Singapore (SG); Tze Yong Koh, Singapore (SG); Beng Yee Wong, Singapore (SG)

(73) Assignee: Aptus Business Logic PTE Ltd., Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 16/725,865

(22) Filed: Dec. 23, 2019

(65) Prior Publication Data

US 2020/0134591 A1 Apr. 30, 2020

Related U.S. Application Data

(63) Continuation of application No. 16/247,409, filed on Jan. 14, 2019, which is a continuation of application No. PCT/SG2016/050349, filed on Jul. 25, 2016.

(Continued)

(51) Int. Cl.
*G06Q 20/20* (2012.01)
*G06K 19/06* (2006.01)

(52) U.S. Cl.
CPC ..... *G06Q 20/209* (2013.01); *G06K 19/06037* (2013.01); *G06Q 20/20* (2013.01)

(58) Field of Classification Search
None
See application file for complete search history.

(56) References Cited

U.S. PATENT DOCUMENTS 8,643,875 B2  2/2014 Shapiro et al.
9,037,491 B1* 5/2015 Lee ..................... G06Q 20/351
                                                  705/17

(Continued)

FOREIGN PATENT DOCUMENTS

CN     102801710    11/2012
EP      0974890     1/2000

(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.

(Continued)

*Primary Examiner* — Paul Danneman
(74) *Attorney, Agent, or Firm* — Fish & Richardson P.C.

(57) ABSTRACT

First POS transaction summary data associated with a first POS machine is generated. A first authorization code associated with the first POS transaction summary data is transmitted to a first transaction data management module (TDCMM). The first POS transaction summary data is transmitted to a POS transaction data management server. Final POS transaction receipt data is generated, where the final POS transaction receipt data comprises the first POS transaction summary data augmented with adjunctive POS transaction data distinguishable from the first POS transaction summary data. The final POS transaction receipt data is transmitted to at least one receipt generation device within a set of receipt generation devices coupled to the first POS machine.

20 Claims, 9 Drawing Sheets

Related U.S. Application Data

(60) Provisional application No. 62/362,103, filed on Jul. 14, 2016.

(56) References Cited

U.S. PATENT DOCUMENTS

| | | | |
|---|---|---|---|
| 9,105,058 | B2 | 8/2015 | Suzuki |
| 9,208,481 | B2 | 12/2015 | Arzumanyan et al. |
| 9,805,352 | B2 | 10/2017 | Anand et al. |
| 2004/0030600 | A1 | 2/2004 | Lacroix |
| 2005/0023346 | A1 | 2/2005 | Bakker et al. |
| 2011/0184822 | A1 | 7/2011 | Matkovic |
| 2012/0016759 | A1 | 1/2012 | Lee et al. |
| 2012/0316950 | A1 | 12/2012 | Laporte et al. |
| 2013/0054396 | A1* | 2/2013 | Goldfinger ........... G06Q 20/209 705/21 |
| 2013/0188219 | A1 | 7/2013 | Ida et al. |
| 2014/0040014 | A1 | 2/2014 | Anand et al. |
| 2014/0100932 | A1 | 4/2014 | Goldfinger et al. |
| 2014/0122272 | A1 | 5/2014 | Arzumanyan et al. |
| 2014/0222545 | A1* | 8/2014 | Hajji ................... G06Q 20/202 705/14.38 |
| 2014/0307271 | A1 | 10/2014 | Suzuki |
| 2015/0302380 | A1 | 10/2015 | Kalsi et al. |
| 2019/0147429 | A1 | 5/2019 | Koh et al. |

FOREIGN PATENT DOCUMENTS

| | | |
|---|---|---|
| JP | 2002074185 | 3/2002 |
| KR | 20030095326 | 12/2003 |

OTHER PUBLICATIONS

Extended European Search Report in European Application No. 16908970.3, dated Jul. 1, 2019.
International Preliminary Report on Patentability in International Appln. No. PCT/SG2016/050349, dated Jan. 15, 2019, 8 pages.
International Search Report and Written Opinion by the International Searching Authority issued in International Application No. PCT/SG2016/050349 dated Oct. 26, 2016; 11 pages.
Nakamoto, "Bitcoin: A Peer-to-Peer Electronic Cash System," www.bitcoin.org, 2005, 9 pages.

* cited by examiner

SYSTEM, DEVICE, AND METHOD FOR CAPTURING AND MANAGING POINT OF SALE TRANSACTION RELATED DATA

CROSS-REFERENCE TO RELATED APPLICATIONS

This application is a continuation of U.S. application Ser. No. 16/247,409, filed on Jan. 14, 2019, which is a continuation of PCT Application No. PCT/SG2016/050349, filed on Jul. 25, 2016, which claims priority to U.S. Provisional Patent Application No. 62/362,103, filed on Jul. 14, 2016, and each application is hereby incorporated by reference in its entirety.

TECHNICAL FIELD

Aspects of the present disclosure are directed to point of sale (POS) transaction data capture, management, and/or analysis systems, devices, and processes. More particularly, multiple POS machines, which can include technologically different POS machines (e.g., different POS machine brands or models), can each be augmented or equipped with POS transaction data capture and management software, without requiring any modification to as-manufactured POS machine software or hardware. Each POS transaction data capture and management module is configured for intercepting or capturing POS transaction related data directed to one or more output ports or output devices of its corresponding POS machine; and communicating captured POS transaction related data to a remote POS transaction data storage, processing, management, and/or analysis server.

BACKGROUND

Data generated as a result of or in association with the completion of a sequence of point of sale (POS) transactions (e.g., product and/or service purchases) can be useful to multiple entities or parties, such as the owner of a business at which the POS transaction sequence occurred; a business landlord; a government agency; a payment (e.g., credit or debit card) processing entity; product manufacturers and/or distributors; and other consumers of POS transaction data or analyses derived therefrom.

Unfortunately, conventional techniques for extracting POS transaction data from POS systems or machines that generate such data require modification to underlying POS machine software, and/or modification or augmentation of POS machine hardware. Such hardware and/or software modification is needlessly expensive and time consuming, and requires expertise that most business owners do not directly possess.

Moreover, prior types of POS transaction data extraction systems, such as that described in U.S. Pat. No. 8,643,875, require a purchaser, customer, or buyer to provide contact information such as an e-mail address and/or a telephone number by which they can be identified. Requiring such purchaser interaction with a POS system needlessly delays completion of the POS transaction sequence, and needlessly intrudes upon the purchaser's privacy.

A need exists for a manner of overcoming the aforementioned drawbacks associated with existing systems and techniques for extracting POS transaction data.

SUMMARY

In accordance with an aspect of the present disclosure, a process for point of sale (POS) transaction data management includes: (1) providing a set of POS machines, each POS machine having: a processing unit; a memory coupled to the processing unit; and underlying POS machine software executable by the processing unit and configured for outputting POS transaction summary data as part of conventional operations performed by the underlying POS machine software; (2) coupling a set of input devices including an item scanner to each POS machine; (3) coupling a set of receipt generation devices to each POS machine; (4) for each POS machine within the set of POS machines, associating a POS transaction data management module (TDCMM) with the POS machine by way of installing the TDCMM on (a) the POS machine such that the TDCMM is distinct from, not integrated with, and operates outside of the execution context of the underlying POS machine software of the POS machine on which the TDCMM is installed, (b) a print server to which the POS machine is coupled, such that the TDCMM is distinct from, not integrated with, and operates outside of the execution context of underlying print server software of the print server on which the TDCMM is installed, or (c) a network capable device such that the TDCMM presents itself as a network printer to the POS machine (e.g., the TDCMM operates as or assumes the role of a network capable printer relative to the POS machine), wherein each TDCMM is configured for (i) capturing POS transaction summary data output by the underlying POS machine software of each POS machine with which the TDCMM is associated before such POS transaction summary data can be communicated to the set of receipt generation devices coupled to each POS machine with which the TDCMM is associated, and (ii) controlling the provision of POS transaction receipt data to the set of receipt generation devices coupled to any given POS machine from which the TDCMM captures POS transaction summary data; (5) providing a POS transaction data 5 management server remote from each TDCMM and operable for network communication with each TDCMM; (6) outputting by the underlying POS machine software of a first POS machine first POS transaction summary data for which a corresponding individual receipt has not yet been generated; (7) capturing with a first TDCMM associated with the first POS machine the first POS transaction summary data, such that the first TDCMM temporarily withholds provision of the first POS transaction summary data to the set of receipt generation devices coupled to the first POS transaction machine; (8) communicating or attempting to communicate the captured first POS transaction summary data from the first TDCMM to the POS transaction data management server; (9) generating by way of the first TDCMM final POS transaction receipt data, wherein the final POS transaction receipt data comprises the captured first POS transaction summary data augmented with adjunctive POS transaction data distinguishable from the first POS transaction summary data (e.g., meta-data relevant to the first POS transaction summary data); and (10) communicating (e.g., by way of wire-based and/or wireless signal transfer) the final POS transaction receipt data from the first TDCMM to at least one receipt generation device within the set of receipt generation devices coupled to the first POS machine. The process can further include (11) producing at least one of a paper receipt and an e-receipt corresponding to the final POS transaction receipt data by way of the at least one receipt generation device to which the final POS transaction receipt data was communicated.

For each TDCMM, the operation of the TDCMM is transparent with respect to the underlying POS machine software of each POS machine with which the TDCMM is associated, and the generation of POS transaction summary data by the underlying POS machine software of each POS machine with which the TDCMM is associated is unaffected by the presence and operation of the TDCMM. Furthermore, the operation of the TDCMM can occur locally within the POS machine, or the TDCMM can operate remotely in a network, where the TDCMM operates or acts as a network printer for the underlying POS machine software.

The process can also include receiving at the POS transaction data management server the first POS transaction summary data; identifying by way of the POS transaction data management server first adjunctive POS transaction data, wherein the data content of the first adjunctive POS transaction data is dependent upon one or more POS transactions identified within the first POS transaction summary data; and communicating the first adjunctive POS transaction data to the first TDCMM, wherein the adjunctive POS transaction data of the final POS transaction receipt data comprises the first adjunctive POS transaction data.

The process can additionally include identifying by way of the first TDCMM second adjunctive POS transaction summary data relevant to the first POS transaction summary data, wherein the second adjunctive POS transaction summary data locally resides in the memory of the first POS machine and/or a data storage unit thereof prior to communication or attempted communication of the first POS transaction summary data to the POS transaction data management server, and wherein the adjunctive POS transaction data of the final POS transaction receipt data comprises the second adjunctive POS transaction data. The second adjunctive POS transaction data can include or be meta-data that may be relevant or generally relevant to the first POS transaction summary data, which does not or need not change or vary for each individual or distinct POS transaction sequence. For instance, the second adjunctive POS transaction data can include at least one of a business name, a business logo, a business operating schedule corresponding to a business at which the first POS machine is located, a promotional/advertising message, and a set of images.

The process can also include receiving by the first TDCMM first redeemable certificate data corresponding to a first redeemable certificate presented by a buyer in association with a current set of POS purchase transactions, wherein the first redeemable certificate data was captured or input by a first input device coupled to the first POS machine; communicating the first redeemable certificate data to the POS transaction data management server; validating the first redeemable certificate data by the POS transaction data management server; and returning to the first TDCMM a first authorization code corresponding to the first redeemable certificate data. Returning the first authorization code occurs prior to communication or attempted 5 communication of the first POS transaction summary data to the POS transaction management server.

The process can additionally include capturing with the first TDCMM second POS transaction summary data, the second POS transaction summary data comprising reporting data corresponding to multiple distinct sequences of POS transactions handled by the first POS machine across separate purchase transactions with respect to a particular time period; and communicating the second POS transaction summary data to the POS transaction data management server.

The process can also include providing a POS transaction database accessible to the POS transaction data management server, wherein the POS transaction database stores historical POS transaction data corresponding to POS transaction summary data received from one or more TDCMMs; analysing the historical POS transaction data in accordance with particular criteria; and communicating results corresponding to an analysis of historical POS transaction data to one or more external computing systems or devices. Non-limiting representative examples of external computing systems or devices include one or more of a seller electronic/computing device, a loyalty/rewards system, a customer relationship management system, a third party POS transaction information consumer device, a payment system, a big data analytics system, and a credit scoring system.

In accordance with an aspect of the present disclosure, a system for point of sale (POS) transaction data management includes: (1) a set of POS machines, each POS machine having: a POS machine processing unit; a memory coupled to the POS machine processing unit; and underlying POS machine software executable by the POS machine processing unit and configured to output POS transaction summary data as part of standard operations performed by the underlying POS machine software; (2) a set of input devices including an item scanner coupled to each POS machine; (3) a set of receipt generation devices operable to receive receipt data corresponding to at least some POS machines; (4) optionally, a print server coupled to at least one POS machine within the set of POS machines, the print server coupled to a printer operable as a 5 receipt generation device coupled to the at least one POS machine, the print server having: a print server processing unit; a memory coupled to the print server processing unit; and underlying print server software executable by the print server processing unit and configured for performing conventional print server operations; (5) a POS transaction data management module (TDCMM) associated with each POS machine within the set of POS machines by way of the TDCMM being installed on (a) the POS machine such that the TDCMM is distinct from, not integrated with, and operates outside of the execution context of the underlying POS machine software of the POS machine on which the TDCMM is installed, (b) the print server, such that the TDCMM is distinct from, not integrated with, and operates outside of the execution context of the underlying print server software, or (c) a network capable device such that the TDCMM presents itself as a network printer to one or more POS machines, wherein each TDCMM comprises program instructions that when executed (i) capture POS transaction summary data output by the underlying POS machine software of each POS machine with which the TDCMM is associated before such POS transaction summary data can be communicated to the set of receipt generation devices coupled to each such POS machine, and (ii) control the provision of POS transaction receipt data to the set of receipt generation devices coupled to the particular POS machine; and (6) a POS transaction data management server remote from each TDCMM and operable for network communication with each TDCMM.

Each TDCMM includes program instructions which when executed: capture or intercept POS transaction summary data output by each POS machine with which the TDCMM is associated; temporarily withhold the provision of POS transaction summary data output by each POS machine with which the TDCMM is associated to the set of receipt generation devices coupled to such POS machines; communicate or attempt to communicate POS transaction summary data captured from each POS machine with which the TDCMM is associated to the POS transaction data management server; and for any particular POS machine with which the TDCMM is associated: generate final POS transaction receipt data as a combination of captured POS transaction summary data output by the particular POS machine plus adjunctive POS transaction data distinguishable from the captured POS transaction summary data; and provide the final POS transaction receipt data to one or more receipt generation devices within the set of receipt generation devices coupled to the particular POS machine.

The POS transaction data management server can include: a processing unit; a memory coupled to the processing unit; and an adjunctive POS transaction data generation module comprising program instructions resident within the POS transaction data management server memory, which when executed determine whether first adjunctive POS transaction data corresponding to POS transaction summary data received from any particular TDCMM exists, and communicate or attempt to communicate such first adjunctive POS transaction data to the particular TDCMM.

Each TDCMM can further include program instructions which when executed: receive from an input device coupled to each POS machine with which the TDCMM is associated redeemable certificate data corresponding to a redeemable certificate presented by a buyer in association with a current set of POS transactions; and communicate received redeemable certificate data to the POS transaction data management server.

The POS transaction data management server can further include a redeemable certificate validation module comprising program instructions which when executed (i) determine whether redeemable certificate data received from a particular TDCMM is valid, (ii) return an authorization code to the particular TDCMM if the redeemable certificate data is valid, and (iii) designate validated redeemable certificate data as used.

The system can further include a POS transaction database accessible to the POS transaction data management server, wherein the POS transaction database stores historical POS transaction data corresponding to POS transaction summary data received from one or more TDCMMs, and wherein the POS transaction data management server comprises program instructions which when executed analyze the historical POS transaction data in accordance with particular criteria, and communicate results corresponding to analysis of historical POS transaction data to one 5 or more external computing systems or devices. Representative non-limiting examples of external computing systems or devices include one or more of a seller electronic/computing device, a loyalty/rewards system, a customer relationship management system, a third party POS transaction information consumer device, a payment system, a big data analytics system, and a credit scoring system.

DETAILED DESCRIPTION

Figure 1:
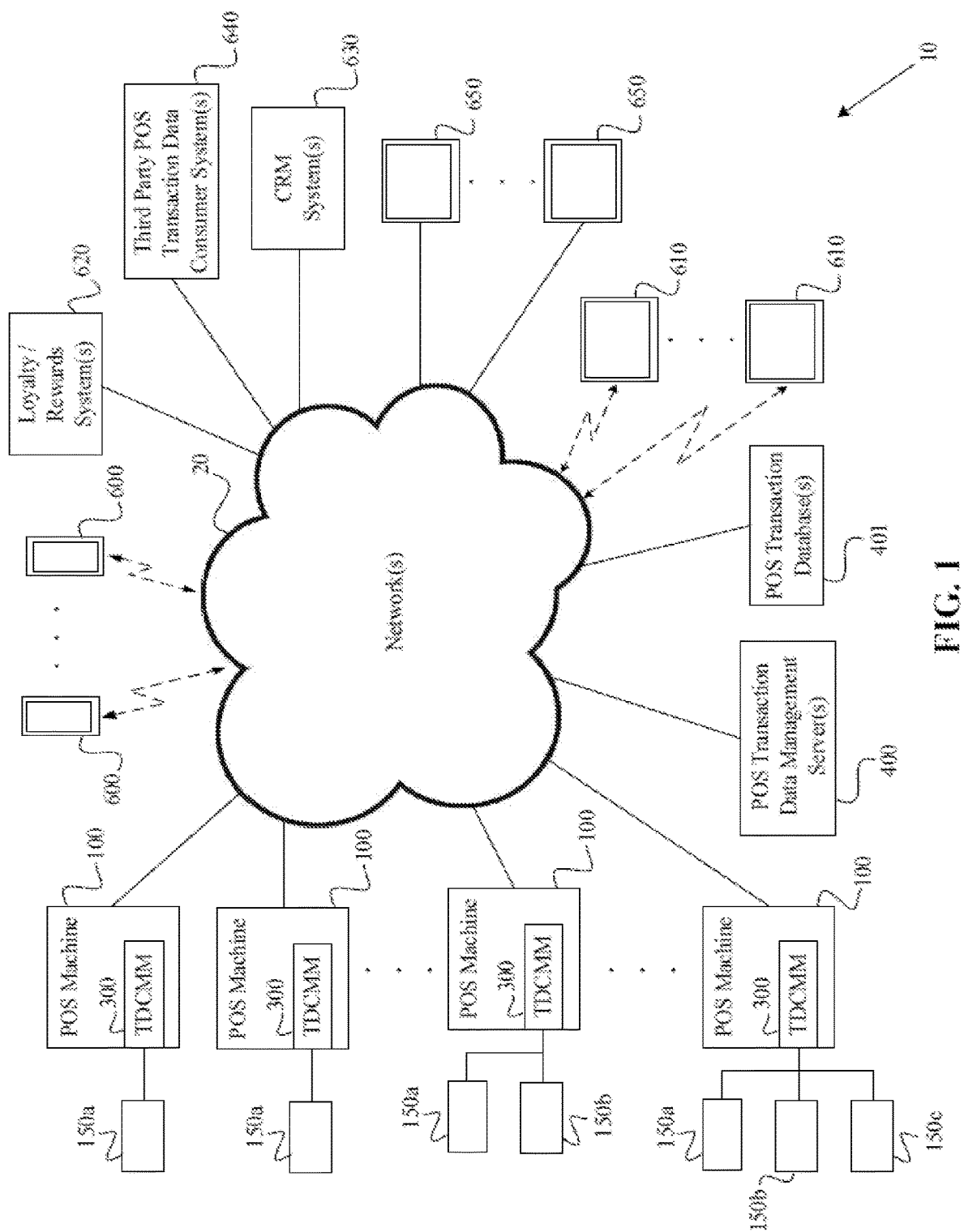
FIG. 1 is a schematic illustration of a point of sale (POS) data capture and management system in accordance with a representative embodiment of the present disclosure, in which POS systems or machines are communicatively coupled to POS transaction data capture and management modules (TDCMMs).

The present disclosure references various representative non-limiting embodiments provided for purpose of illustration to aid understanding. In the present disclosure, depiction of a given element or consideration or use of a particular element number in a particular FIG. or a reference thereto in corresponding descriptive material can encompass the same, an equivalent, or an analogous element or element number identified in another FIG. or descriptive material associated therewith. The use of "/" in a FIG. or associated text is understood to mean "and/or" unless otherwise indicated. The recitation of a particular numerical value or value range herein is understood to include or be a recitation of an approximate numerical value or value range.

As used herein, the term "set" corresponds to or is defined as a non-empty finite organization of elements that mathematically exhibits a cardinality of at least 1 (i.e., a set as defined herein can correspond to a unit, singlet, or single element set, or a multiple element set), in accordance with known mathematical definitions (for instance, in a manner corresponding to that described in An Introduction to Mathematical Reasoning: Numbers, Sets, and Functions, "Chapter 11: Properties of Finite Sets" (e.g., as indicated on p. 140), by Peter J. Eccles, Cambridge University Press (1998)). In general, an element of a set can include or be a system, an apparatus, a device, a structure, an object, a process, a physical parameter, or a value depending upon the type of set under consideration.

The terms "program instructions," "program instruction sets," and "software" herein can correspond or refer to high level and/or low level (e.g., firmware) program instruction resources, routines, procedures, or sequences that are storable in and retrievable from one or more types of information or data storage media, and which are executable by one or more processing units for performing particular types of services, functions, or operations in accordance with or in support of embodiments of the present disclosure, in a manner readily understood by individuals having ordinary skill in the relevant art. The term "module" as used herein can typically or primarily correspond or refer to program instruction set or software resources; and the term "unit" as used herein can typically or primarily correspond or refer to hardware resources, and can include associated software resources (e.g., firmware) that support or enable specific types of hardware resource capabilities or functions, in a manner readily understood by individuals having ordinary skill in the relevant art.

The terms "data communication" and "communication" can correspond to or involve wire-based and/or wireless data transfer, in a manner readily understood by individuals having ordinary skill in the relevant art.

Overview

Various embodiments in accordance with the present disclosure include or are directed to a point of sale or point of service (POS) system, apparatus, device, or machine (e.g., essentially any type of modern POS machine, for instance, a conventional POS machine deployed in (a) a retail store environment; (b) a kiosk, such as in a shopping mall; or (c) other environment), which has been enhanced or augmented with a POS transaction data capture and management module (TDCMM). The POS TDCMM is configured for (i) intercepting, capturing, or receiving particular forms of POS transaction related data, which can be referred to as POS transaction summary data, generated by the POS machine's underlying, native, as-manufactured, or built-in software; and (ii) communicating POS transaction summary data to a POS transaction data management server, as further described below.

POS transaction summary data can include or be any or essentially (i) any type of data corresponding to individual POS transactions within a unified or common POS transaction sequence (e.g., a single purchase transaction), and/or (ii) aggregated or statistical information generated or derived from one or more POS transaction sequences. Such POS transaction summary data is produced, output, or providable by the underlying POS machine software as part of its ordinary or typical operations. Thus, POS transaction summary data can include or be any or essentially any type of POS information corresponding to or based upon one or more POS transaction histories. In several embodiments, multiple distinguishable or distinct categorical types of POS transaction summary data can be defined. For instance, a first categorical type of POS transaction summary data corresponds to receipt data generated or provided for a particular set of purchase transaction operations or a purchase transaction sequence most recently handled or processed by the POS machine in association with the purchase of one or more products, goods, items, and/or services by a given purchaser or customer. Consequently, the first categorical type of POS transaction summary data can simply be referred to as individual receipt data or buyer receipt data. A second categorical type of POS transaction summary data corresponds to multiple sequences or series of POS transactions handled by the POS machine across distinct or separate purchase transactions (e.g., by different buyers), for instance, with respect to a particular time period or interval (e.g., a work shift, a workday, or another time period such as a week), and/or a particular POS machine operator (e.g., a cashier). The second categorical type of POS transaction summary data can correspond, for example, to an end-of-shift POS transaction data report, which provides information about POS transactions (e.g., all POS transactions, or a portion thereof such as only purchase transactions) that occurred during the most-recently completed work shift; an end-of-day POS transaction data report, which provides information about POS transactions (e.g., all POS transactions, or a portion thereof) that occurred during the most-recently completed work day; or an on demand POS transaction data report, which provides information about POS transactions (e.g., all POS transactions, or a portion thereof) that occurred since the generation of a prior POS transaction data report. Consequently, the second categorical type of POS transaction summary data can be referred to as reporting data. For purpose of brevity and to aid understanding, different categorical types of POS transaction summary data are simply referred to hereafter as POS transaction summary data.

As will be readily understood by individuals having ordinary skill in the relevant art, a POS machine includes at least one processing unit (e.g., a microprocessor or similar/analogous device) configured as a microprocessor; a memory; an operating system configured for enabling POS machine resource sharing among distinct or different software tasks or threads; and underlying POS machine software (e.g., at least one set of program instructions) stored in the memory which when executed by the processing unit performs conventional POS transaction processing operations. The POS machine can also be coupled to or include a cash register, cash register unit, or cash drawer unit; and typically a purchase item/product scanner (e.g., a barcode and/or Quick Response (QR) code scanner). The POS machine can be further coupled to or includes a payment card (e.g., credit/debit card) and/or electronic payment (e.g., e-wallet) processing device. The POS machine additionally can include or be coupled to a network interface unit by which the POS machine can send and receive data over one or more computer networks, such as a local area network (LAN) and/or the Internet. Additionally, the POS machine is coupled to or includes at least one display device (e.g., one or more liquid crystal display (LCD) devices).

Moreover, the POS machine is coupled to or includes at least one type of receipt generation, provision, or output device. A given receipt generation device can include or be a physical or tangible receipt output device such as a conventional printer configured for outputting a paper receipt; or an electronic receipt ("e-receipt") output device configured for outputting a digital version or representation of a receipt. Depending upon embodiment details, an e-receipt generation device can include a wireless communication device such as a near-field communication (NFC) unit configured for communicating digital receipt information to a corresponding NFC unit carried by a purchaser's portable electronic/computing device (e.g., a mobile telephone, tablet computer, or phablet); or an optical display device (e.g., an LCD device) configured for presenting a machine readable code such as a Quick Response (QR) code, which can be captured by a camera carried by the purchaser's portable electronic/computing device.

As indicated above, the POS transaction summary data produced by the underlying POS machine software can digitally correspond to, represent, or identify a most-recently completed set of POS transactions or a most-recently completed POS transaction sequence under consideration, for instance, corresponding to the purchase of and payment for specific products and/or services from a seller, retailer, business, or organization by a purchaser, or the return of specific products by the purchaser and the issuance of a refund therefor. For purpose of brevity and ease of understanding, the description hereafter is directed to product and/or service purchase transactions, rather than product return transactions. However, individuals having ordinary skill in the relevant art will recognize that aspects of the present disclosure described with respect to product/service purchase transactions apply equally to product return transactions.

For a given completed POS transaction sequence, its corresponding POS transaction summary data can correspond to or include at least some of the following: a business or organization identifier (e.g., a name and logo) indicating the business or organization for or at which the POS transaction summary data was generated; a unique POS machine ID identifying the POS machine that generated the POS transaction summary data; location information corresponding to this POS machine and/or business, for instance, a set of geospatial coordinates such as global positioning satellite (GPS) coordinates corresponding to this POS machine and/or business; possibly a cashier name; an itemized list identifying purchased products/services; the price of each purchased product/service; a quantity of each purchased product/service; possibly a price adjustment or discount applied to one or more purchased products/services, and an indication of whether a redeemable certificate was used in association therewith; an initial or first price total; possibly a price adjustment or discount applied to the initial price total; a sales tax total; a final or second price total (e.g., a grand total); a payment mode (e.g., cash, credit card, debit card, or gift card); and possibly other information, in a manner readily understood by individuals having ordinary skill in the relevant art. The POS transaction summary data corresponds to or includes information that conventionally appears on an ordinary purchase receipt.

In addition or as an alternative to the foregoing, the POS transaction summary data can include or be based upon or derived from multiple distinct or distinguishable POS transaction sequences that have occurred with respect to a predetermined or selectable/programmable time interval (e.g., a shift-based or workday-based time interval), and/or which occurred under the direction of one or more POS machine operators (e.g., cashiers).

The POS TDCMM is distinct or separate from and is not integrated with or into the POS machine underlying software, and hence the POS TDCMM as installed is distinct from the POS machine underlying software, and executes or operates outside of the execution context of the POS machine underlying software. Moreover, the augmentation of the POS machine with the POS TDCMM requires no modification or customization of the POS machine's underlying software. Additionally, the POS TDCMM operates or is configured to operate without the POS machine's underlying software recognizing the presence or existence of the POS TDCMM, e.g., the POS TDCMM is completely transparent or invisible to the underlying POS machine software, and hence the underlying POS machine software is unaware of and does not control (e.g., has no control over) the operations performed by the POS TDCMM. The generation of POS transaction summary data by the underlying POS machine software is unaffected by the presence and operation of the POS TDCMM.

Also, the augmentation of the POS machine with the POS TDCMM requires no modification or customization of the POS machine's hardware. In several embodiments, the augmentation of the POS machines with the TDCMM does not or need not require the addition of any extra hardware to or between either the POS machine or the receipt generation device(s) with which the POS machine normally operates. Furthermore, the existence of the POS TDCMM is or is typically configured to be completely transparent or invisible with respect to the port(s) and receipt generation device(s) to which POS transaction summary data is ordinarily sent by the underlying POS machine software. Thus, from the perspective of the receipt generation device(s), the POS TDCMM is invisible or transparent with respect to the origin(s) or source(s) 5 from which the POS transaction summary data is ordinarily received.

More particularly, in various embodiments the POS TDCMM exists as a POS transaction data or POS transaction summary data interception or capture element that is implemented as software (e.g., entirely as software), and which is positioned (e.g., intermediate) or communicatively coupled between (a) one or more POS transaction summary data output destinations (e.g., output device drivers, and/or output device ports) to which the underlying POS software sends POS transaction data or POS transaction summary data; and (b) a set of receipt generation devices coupled or corresponding to such POS transaction summary data output destinations. Thus, relative to a given output destination (e.g., output port) corresponding to a particular receipt generation device, the POS TDCMM corresponding to that output destination exists as a data reception, interception, or capture element configured for capturing POS transaction data or POS transaction summary data (e.g., POS transaction summary data for which an individual receipt has not yet been generated), such that the POS TDCMM obtains the POS transaction data or POS transaction summary data (e.g., from such output port) rather than the POS transaction data or POS transaction summary data being sent directly from the output destination (e.g., the output port) to the receipt generation output device coupled or corresponding to the output destination (e.g., the output port). Stated analogously or equivalently, the POS TDCMM captures POS transaction summary data output by the POS machine underlying software, before this POS transaction summary data can be sent to or arrives at a receipt generation device (e.g., any receipt generation device(s) to which the POS machine underlying software directed the POS transaction summary data).

In various embodiments, the POS TDCMM further exists as a data network communication element configured for (i) communicating captured POS transaction summary data to a remote POS transaction data storage, processing, management, and/or analysis server (hereafter "POS transaction data management server"); and typically or possibly (ii) receiving adjunctive POS transaction data from the POS transaction data management server, where particular adjunctive POS transaction data can be based on or independent of the POS transaction summary data that the POS TDCMM communicated to the POS transaction data management server. The adjunctive POS transaction data can include, for instance, redeemable certificate data (e.g., product/item related voucher, coupon, or special/promotional offer data), and/or other types of data (e.g., notification data, such as holiday business opening and/or closing times, or special event announcements/reminders). In general, the adjunctive POS transaction data includes or is meta-data that the POS TDCMM links, associates, or combines with POS transaction summary data (e.g., in a predetermined, selectable, or programmable manner).

The POS TDCMM also exists as a purchase receipt data provision element configured for assembling or generating final POS transaction receipt data, and providing the final POS transaction receipt data to the receipt generation device(s) to which the POS TDCMM corresponds, and to which the underlying POS software originally directed the POS transaction summary data. The final POS transaction receipt data includes the POS transaction summary data plus received adjunctive POS transaction data, which the POS TDCMM can append or prepend to the POS transaction summary data. Alternatively, the POS TDCMM can organize particular portions of the POS transaction summary data and the adjunctive POS transaction data relative to each other in another manner, for instance, in a selective or customizable manner. Typically, the final POS transaction receipt data also includes a QR code or other type of machine-readable code that uniquely references, identifies, and/or includes or encodes the final POS transaction receipt data. Upon receiving the final POS transaction receipt data, the set of receipt generation devices provides, presents, or communicates at least one type of corresponding final POS transaction receipt, which includes at least some of the POS transaction summary data and the adjunctive POS transaction data provided by the POS transaction data management server, and which typically includes the QR code or other machine-readable code that uniquely identifies the final POS transaction receipt data.

In addition to the foregoing, the POS TDCMM need not or does not require and need not or does not capture any information (e.g., an e-mail address and/or mobile telephone number) identifying the purchaser corresponding to a completed POS transaction sequence under consideration. As further detailed below, in some embodiments a purchaser can associate themselves with a particular final POS transaction receipt by way of subsequent communication between a purchaser electronic/computing device and the POS transaction data management server. Such communication can include the communication of a digital code (e.g., a Quick Response (QR) code included as part of a paper or e-receipt provided to the purchaser) corresponding to the final POS transaction receipt along with a purchaser e-mail address, mobile telephone number, and/or other unique purchaser identifier (ID) from the purchaser electronic/computing device to the POS transaction data management server.

In association with the foregoing, various embodiments in accordance with the present disclosure are further directed to aspects of a networked system that includes multiple POS machines, each of which is equipped or augmented with a POS TDCMM as described above, where such POS machines can include technologically different POS machines (e.g., different POS machine brands or models, which can operate in accordance with different protocols, and which commonly include proprietary underlying POS machine software); and at least one POS transaction data management server coupled (e.g., by way of the Internet) to the POS machines. In such a system, each POS TDCMM can be configured to communicate with one or more POS transaction data management servers. The POS transaction data management server(s) can have associated therewith, be coupled to, or include one or more systems, subsystems, and/or devices that provide particular types of hardware and software resources by which product purchasers, business owners/managers (e.g., retailers) corresponding to the POS machines, product suppliers (e.g., product distributors and/or manufacturers), business landlords, government agencies, payment processing entities and/or other parties can communicate with the POS transaction data management server(s) by way of electronic/computing devices (e.g., desktop computers, laptop computers, tablet computers, mobile telephones, phablets, and/or other types of devices) for purpose of retrieving, managing, and/or analyzing POS transaction related information and/or information derived therefrom that is of relevance or potential relevance to such parties. 5 Such hardware and software resources associated with or provided by the POS transaction data management server(s) can include processing resources, memory resources, executable program instruction sets, database resources, network communication resources, and user interface resources (e.g., graphical user interfaces (GUIs)), in a manner readily understood by individuals having ordinary skill in the relevant art.

Representative Aspects of POS Systems and Machines Augmented with POS TDCMMs

FIG. 1 is a schematic illustration of a system 10 for capturing, managing, and analyzing POS transaction data in accordance with particular non-limiting representative embodiments of the present disclosure. In an embodiment, the system 10 includes multiple POS machines 100a-n that are enhanced or augmented with POS TDCMMs 300 (e.g., each POS machine 100 is enhanced or augmented with a corresponding POS TDCMM 300). In the absence of the POS TDCMMs 300, the POS machines 100a-n can be conventional. Each POS machine 100 is coupled either directly or by way of a network (e.g., a LAN) to at least one type of receipt generation device 150, such as a paper receipt generation device or printer 150a, an NFC receipt generation unit or device 150b, or an optical QR code receipt generation unit or device 150c. The POS machines 100a-n need not be technologically or communicatively compatible relative to each other. For instance, particular subsets of POS machines 100 can have different/incompatible hardware elements, and/or different/incompatible underlying POS machine software (e.g., which can be proprietary manufacturer dependent and/or model dependent software).

The TDCMM-enhanced POS machines 100a-n are disposed at or within corresponding POS transaction locations, each of which corresponds to a particular type of business, organization, or site at which purchasers can buy or pay for particular types of products and/or services, in a manner readily understood by individuals having ordinary skill in the relevant art. For instance, a given POS transaction location and the POS machine(s) 100 disposed thereat can correspond to a grocery store, a book store, a restaurant, a medical or dental facility, a kiosk, or other type of POS transaction entity or site. Different POS machines 100a-n can be distributed across or reside at different (e.g., widely different) geographic locations, in a manner also readily understood by individuals having ordinary skill in the relevant art.

The POS TDCMMs 300 are configured for data communication with at least one remote POS transaction data management server 400 by way of a set of data communication networks 20 (e.g., including the Internet), and the POS transaction data manager 400 is configured for data communication with a set of POS transaction databases 401. In several embodiments, the system 10 further includes at least some of (a) set of purchaser electronic/computing systems or devices 600 by which purchasers can communicate with the POS transaction data management server 400; (b) a set of seller electronic/computing systems or devices 610 by which sellers can communicate with the POS transaction data management server 400; (c) a set of loyalty/rewards systems 620 (e.g., which can be conventional) configured or configurable for communication with the POS transaction data management server 400; (d) a set of customer relationship management (CRM) systems 630 (e.g., which can be conventional) configured or configurable for communication with the POS transaction data management server 400; (e) a set of third party POS transaction information consumer systems, subsystems, or devices 640; and possibly (f) one or more other types of systems, subsystems, or devices 650 configured or configurable for communication with the POS transaction data management server 400. Such other types of electronic/computing systems, subsystems, or devices configured or configurable for communication with the POS transaction data management server 400, for instance, payment systems (not shown), big data analytics systems (not shown), and credit scoring systems (not shown).

A purchaser electronic/computing device 600, a seller electronic/computing device 610, a third party POS transaction information consumer electronic/computing system, subsystem, or device 640, and/or another type of electronic/computing system, subsystem, or device 650 configured or configurable for communication with the POS transaction data management server 400 can include or be a desktop computer, a laptop computer, a tablet computer, a mobile telephone, a phablet, or other type of device. A purchaser electronic/computing device 600, a seller electronic/computing 5 device 610, a third party POS transaction information consumer electronic/computing system, subsystem, or device 640, and another type of electronic/computing system, subsystem, or device 650 with which the POS transaction data management server 400 can communicate can include memory-resident software (e.g., one or more program instruction sets) executable by a set of processing units for communicating with the POS transaction data management server 400 to provide or perform processes or operations relevant to a purchaser, a seller, a third party consumer, or other user or consumer of POS transaction information, respectively, as further detailed below.

Figure 2A:
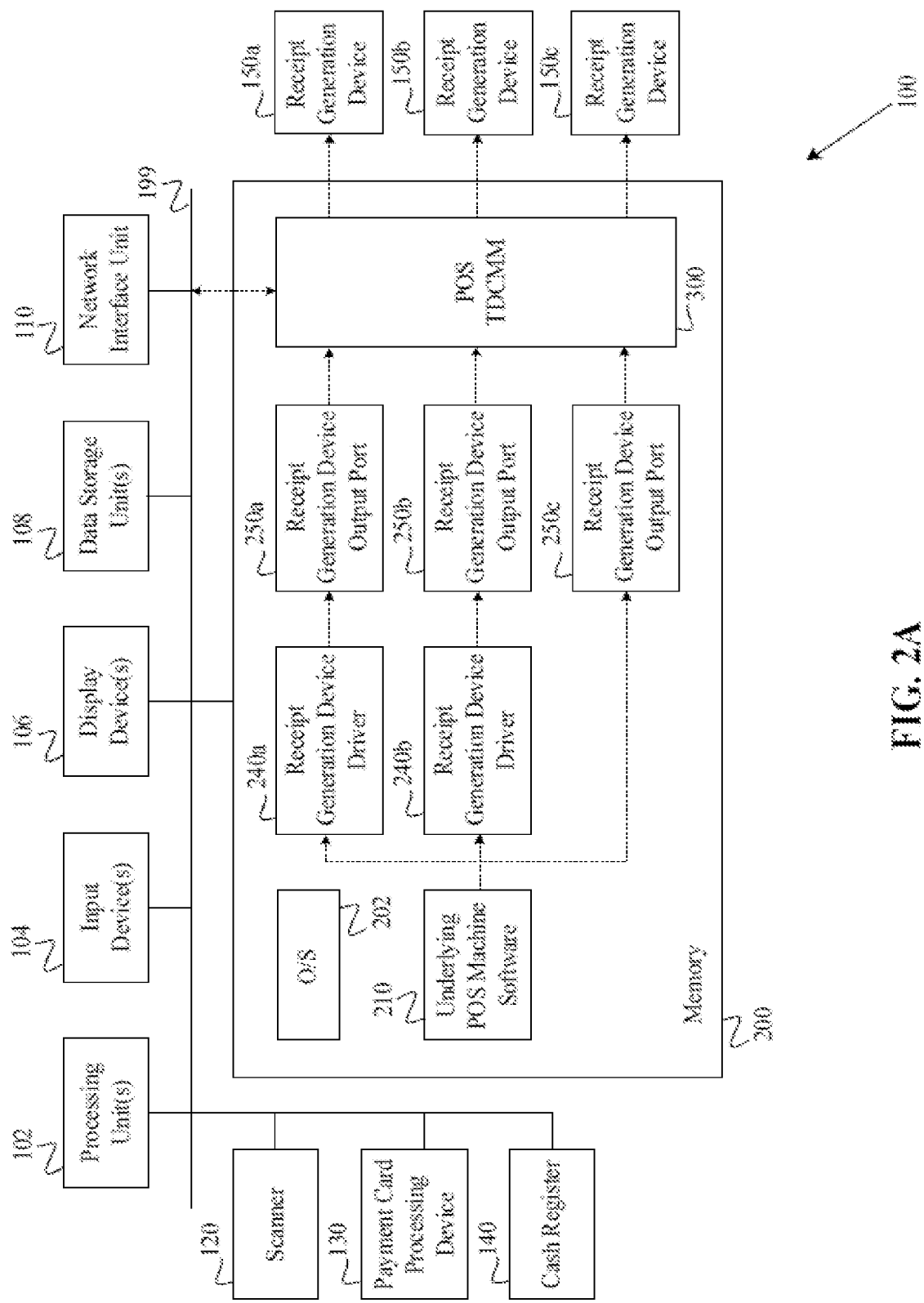
FIG. 2A is a block diagram of a TDCMM-enhanced POS system or machine in accordance with a non-limiting representative embodiment of the present disclosure.

FIG. 2A is a block diagram of a TDCMM-enhanced POS system or machine 100 in accordance with a non-limiting representative embodiment of the present disclosure. In various embodiments, each POS machine 100 is coupled to or includes a processing unit 102 (e.g., a microprocessor); a set of input devices 104 (e.g., a keyboard, and a pointing device such as a mouse); a set of display devices 106 (e.g, one or more LCD devices); a data storage unit 108 (e.g, a hard disk drive, and/or a set of removable data storage devices); a network interface unit 110; a set of receipt generation devices 150*a-c*; and a memory 200. Additionally, the POS machine 100 can possibly be coupled to or include one or more of a product/item scanner 120; a payment card processing device 130; and a cash register or cash drawer unit 140.

The memory 200 includes memory-resident program instruction sets that are executable by the processing unit 102, such as an operating system 202; underlying POS software 210; possibly one or more receipt generation device drivers 240*a,b*; a set of receipt generation device ports 250*a-c* (which can include local and/or network ports, in a manner readily understood by individuals having ordinary skill in the relevant art); and a POS TDCMM 300. Each of the foregoing elements can be coupled to a set of data transfer or communication pathways (e.g., one or more shared/common data transfer pathways) 199, such as a bus. In FIG. 2A, dashed lines having arrows thereon indicate POS transaction related data flow pathways, in a manner understood by individuals having ordinary skill in the relevant art.

In the representative embodiment shown, the set of receipt generation devices 150*a-c* includes a printer 150*a* configured to generate a paper receipt; an NFC receipt generation unit 150*b* configured to generate an NFC e-receipt; and an optical receipt generation unit 150*c* (e.g., an electronic display, which can be part of or distinct/separate from the set of display devices 106) configured for presenting or displaying an optical e-receipt, which can include a QR code and/or other type of machine readable code. Individuals having ordinary skill in the relevant art will understand that the type(s) of receipt generation devices 150*a-c* provided in association with or by a given POS machine 100 can vary depending upon embodiment details. Further to the foregoing, in the embodiment shown in FIG. 2A and depending upon embodiment details, the underlying POS machine software 210 can utilize a receipt generation device driver 240*a,b* to enable data communication with a particular type of receipt generation device 250*a,b* corresponding thereto; and/or the POS machine 100 can output data directly to certain types of receipt generation devices 250*c*, in a manner also readily understood by individuals having ordinary skill in the relevant art. The underlying POS software 210 is configured for sending data (e.g., POS transaction summary data) to one or more receipt generation device output ports 250*a-c* (e.g., on a predetermined or selective basis, such as in accordance with purchaser preference), either by way of an appropriate receipt generation device driver 240*a,b* or directly.

In the embodiment shown, the POS TDCMM 300 is coupled between the set of receipt generation device output ports 250*a-c* and the set of receipt generation devices 150*a-c*, such that the POS TDCMM 300 intercepts or captures data (e.g., POS transaction summary data) that the underlying POS software 210 directed to or output toward or to the set of receipt generation device output ports 250*a-c*, prior to such data arriving at the set of receipt generation devices 150*a-c*.

Figure 2B:
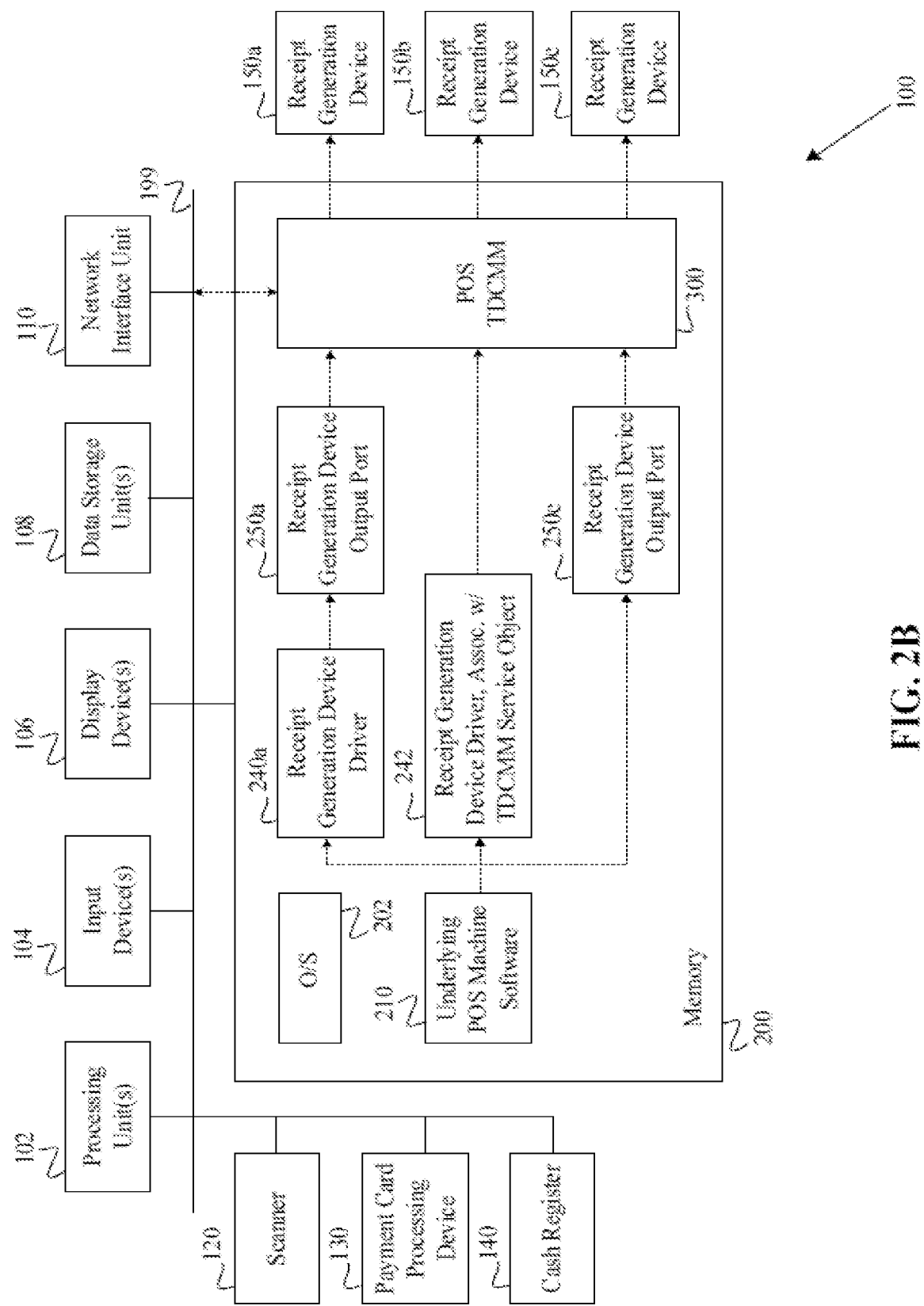
FIG. 2B is a block diagram of a TDCMM-enhanced POS system or machine in accordance with another non-limiting representative embodiment of the present disclosure.

FIG. 2B is a block diagram of a TDCMM-enhanced POS system or machine 100 in accordance with another non-limiting representative embodiment of the present disclosure. As indicated in FIG. 2B, in some embodiments, the TDCMM 300 can additionally or alternatively receive POS transaction summary data directly from a receipt generation device driver associated with a TDCMM service object 242, such that the TDCMM 300 does not or need not receive this POS transaction summary data from a receipt generation device output port 250. Such a configuration can be based on or utilize a receipt device driver that operates in accordance with particular POS industry standards, in a manner readily understood by individuals having ordinary skill in the relevant art.

Figure 2C:
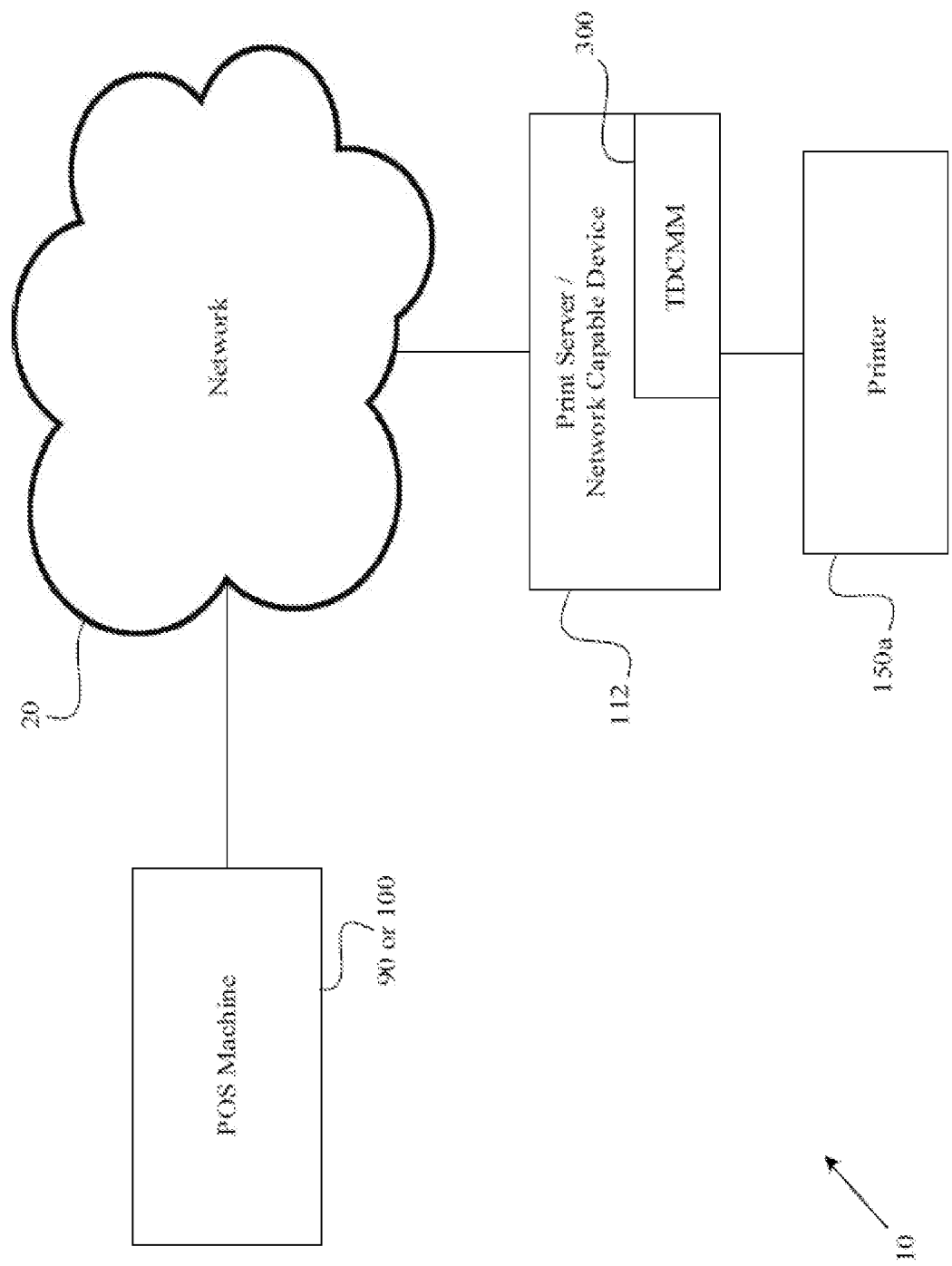
FIG. 2C is a block diagram of a TDCMM-enhanced POS system or machine in accordance with yet another non-limiting representative embodiment of the present disclosure.

FIG. 2C is a block diagram of a system 10 for capturing, managing, and analyzing POS transaction data in accordance with another non-limiting representative embodiment of the present disclosure. In such an embodiment, the system 10 includes at least one (i) POS system or machine 90 that has not been TDCMM-enhanced, and/or (ii) POS system or machine 100 that has been TDCMM-enhanced, where each such POS machine 90, 100 is coupled to a network capable device such as an Internet of Things (IOT) device/box or a print server 112 (e.g., a conventional print server) by way of one or more networks 20 (e.g., a LAN). For purpose of brevity and simplicity, the term print server 112 in the following description encompasses a network capable device, such as an IOT device/box.

In various embodiments, the print server 112 is coupled to one or more printers 150*a* configured for outputting paper receipts. A print server based TDCMM 300 resides in a memory provided by the print server 112, and is executable or executed by way of hardware and software resources provided by the print server 112 (e.g., a processing unit, a memory, an operating system, a network interface unit, etc. . . . ), in a manner readily understood by individuals having ordinary skill in the relevant art. The operation of the TDCMM 300 is independent of and transparent to the print server 112 (e.g., the underlying print server software is unaware of the operation or existence of the TDCMM 300), and thus the TDCMM 300 executes or operates outside of the execution context of the underlying print server software (in addition to executing or operating outside of the execution context of the underlying POS machine software 210 of each POS machine 100 that is coupled to the print server 112). The TDCMM 300 can be implemented or augmented such that it appears to be a network capable printer to the POS machine(s) 90, 100 to which the TDCMM is coupled.

The TDCMM 300 is configured to intercept or capture POS transaction summary data output by the print server 112, before such POS transaction summary data arrives at the printer 150a. Individuals having ordinary skill in the art will recognize that a print server resident TDCMM 300 performs POS transaction summary data capture and communication operations and final POS transaction receipt assembly operations in a manner analogous or essentially identical to embodiments in which the TDCMM 300 resides within the POS machine 100, which are further described in detail below.

Figure 2D:
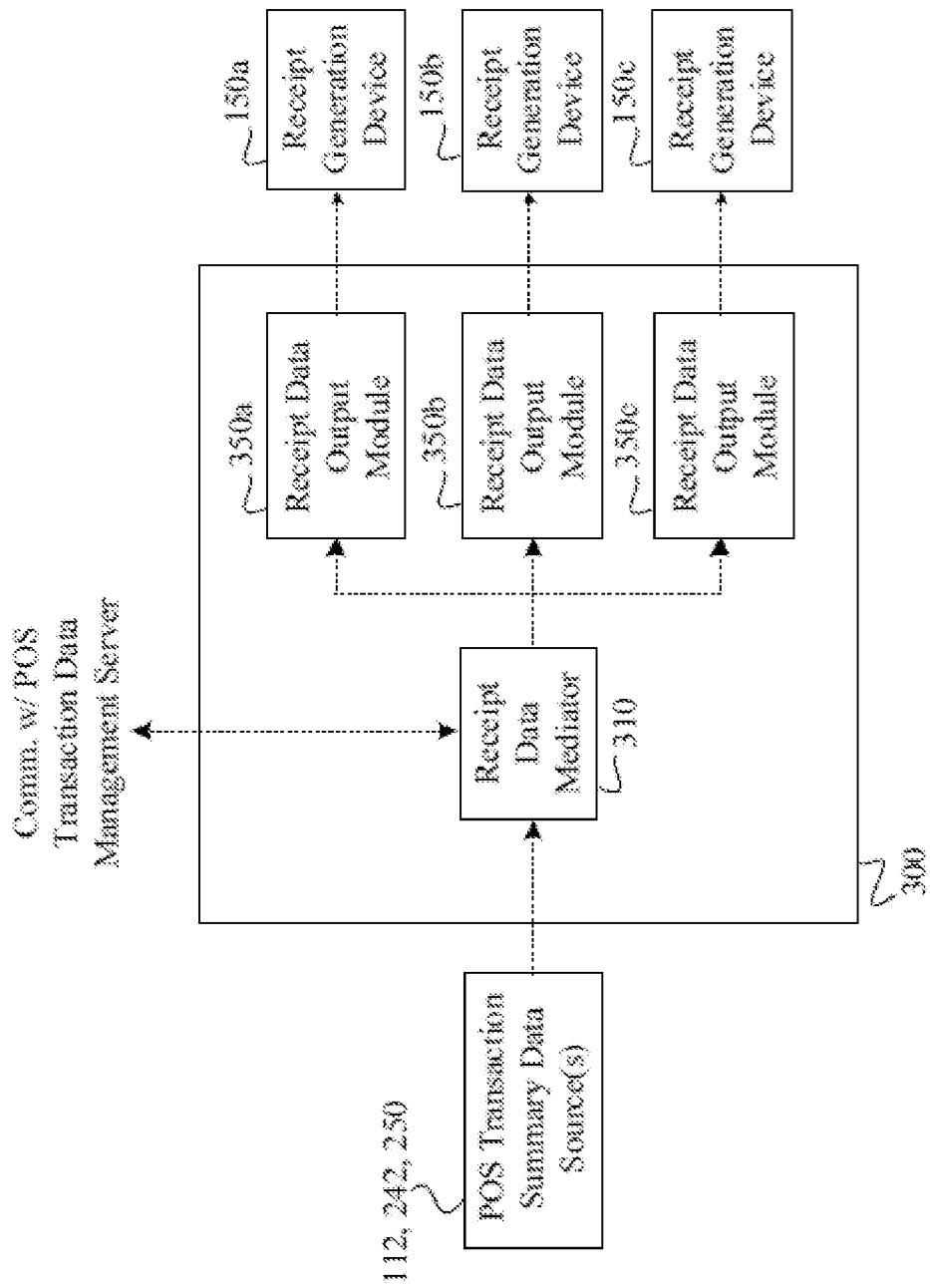
FIG. 2D is a block diagram of a TDCMM in accordance with a non-limiting representative embodiment of the present disclosure.

As shown in FIG. 2D, in multiple representative non-limiting embodiments, the POS TDCMM 300 includes a receipt data mediator 310 and a set of receipt data output modules 350a-c. The receipt data mediator 310 is coupled to receive POS transaction summary data from one or more types of POS transaction summary data sources 112, 242, 250, such as set forth above, before POS transaction summary data is received by or input to a receipt generation device 150 (e.g., any receipt generation device(s) 150). The set of receipt data output modules 350a-c is coupled between the receipt data mediator 310 and the set of receipt generation devices 150a-c, for instance, such that each receipt generation device 150a-c has a receipt data output module 350a-c corresponding thereto. The receipt data mediator 310 is configured for transferring or communicating intercepted or captured POS transaction data (e.g., POS transaction summary data) to the POS transaction data management server 400; receiving adjunctive POS transaction data from the POS transaction data management server 400; generating or assembling final POS transaction receipt data based on or using the POS transaction summary data and adjunctive POS transaction data received from the POS transaction data management server 400 and possibly locally-resident adjunctive POS transaction data; and transferring the final POS transaction receipt data to one or more receipt generation devices 150a-c, in accordance with the particular POS transaction data source(s) 112, 242, 250 from which POS transaction summary data had been captured.

Figure 3:
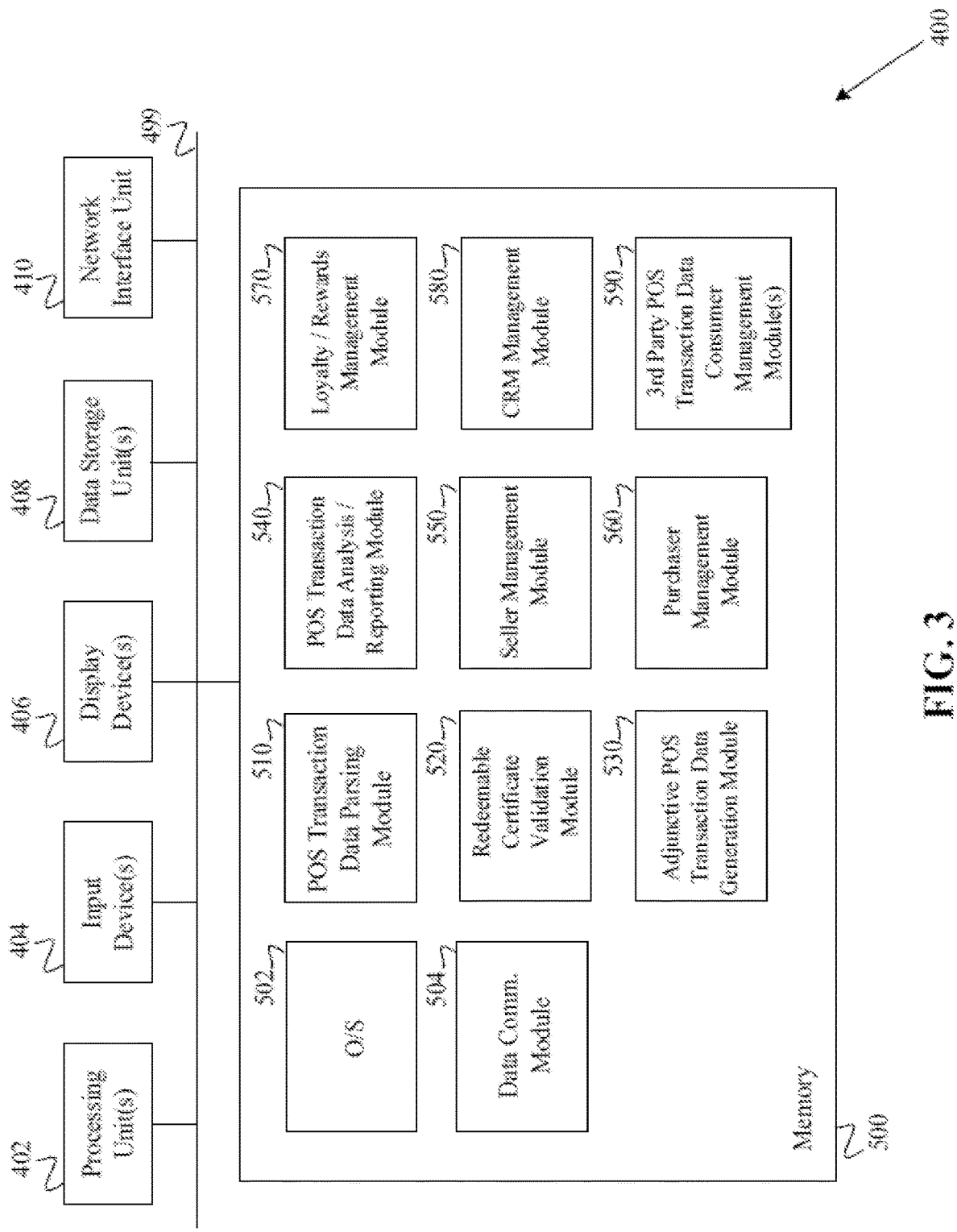
FIG. 3 is a block diagram of a POS transaction data management server in accordance with a non-limiting representative embodiment of the present disclosure.

FIG. 3 is a block diagram of a POS transaction data management server 400 in accordance with a non-limiting representative embodiment of the present disclosure. In an embodiment, the POS transaction data management server 400 includes a set of processing units 402; a set of input devices 404; a set of display devices 406; at least one data storage unit 408; at least one network interface unit 410; and at least one memory 500. Processor-executable program instruction sets reside within the memory 500, including an operating system 502; a data communication module 504; a POS transaction data parsing/processing module 510; a redeemable certificate processing module 520; an adjunctive POS transaction data generation/retrieval module 530; a POS transaction data analysis and reporting module 540; and possibly one or more of a business owner/seller management module 550, a purchaser management module 560, a loyalty/rewards management module 570, a CRM management module 580, and one or more third party POS transaction information consumer management modules 590, where a third party POS transaction information consumer can include or be any third party system, subsystem, or device that requests or consumes POS transaction related information from the POS transaction data management server 400. The memory 500 can additionally or alternatively include one or more other processor-executable program instruction sets such as a payment system management module (not shown), a big data analytics system management module (not shown), and/or a credit scoring system management module (not shown), in a manner readily understood by individuals having ordinary skill in the relevant art in view of the description herein. Each element of the POS transaction data management server 400 can be coupled to a common set of data communication pathways 499, such as a bus.

The operating system 502 is configured for managing access to POS transaction data management server resources, in a manner readily understood by individuals having ordinary skill in the relevant art. The communication module 504 is configured for managing the communication of data between the POS transaction data parsing module 510, the redeemable certificate validation module 520, the adjunctive POS transaction data generation/retrieval module 530, the POS transaction data analysis and reporting module 540, the purchaser management module 550, and other systems/devices external to the POS transaction data management server 400, including 5 TDCMM-enhanced POS machines 100, purchaser electronic/computing devices 600, seller electronic/computing devices 610, loyalty/rewards systems 620, CRM systems 630, third party POS transaction information consumer devices 640, and possibly other electronic/computing systems or devices 650.

The POS transaction data parsing module 510 is configured for storing, parsing, and categorizing POS transaction summary data received from POS machines 100, and updating the POS transaction database 401 accordingly. For any given POS transaction summary data under consideration received from a particular POS machine 100, this can involve (a) storing the POS transaction summary data in the POS transaction database 401; (b) categorizing individual POS transaction data within the POS transaction summary data relative to particular criteria, such as product manufacturer, product/brand name, product purchase price, product purchase quantity, purchase date, purchase time of day, redeemable certificate use, and/or other factors, and storing such categorizations in the POS transaction database 401; and (c) categorizing the POS transaction summary data in accordance with particular criteria, such as business name, business/POS machine location, initial total purchase price, applied sales tax, grand total purchase price, purchase date, purchase time of day, payment type, and/or other factors, and storing such categorizations in the POS transaction database 401.

The redeemable certificate validation module 520 is configured for receiving previously generated redeemable certificate data from POS machines 100 in association with purchase transaction processing thereby. For a given set of POS transactions under consideration, such previously generated redeemable certificate data corresponds to or is encoded within a redeemable certificate (e.g., a voucher or coupon) presented by the purchaser of the products and/or services identified in this set of POS transactions. In several embodiments, for previously generated redeemable certificate data received from a given POS machine 100, the redeemable certificate validation module 520 can access the POS transaction database 401 to determine whether the previously generated redeemable certificate data corresponding to a given set of current POS transactions under consideration is valid, e.g., whether a previously generated redeemable certificate corresponding to the previously generated redeemable certificate data under consideration has not already been used/redeemed, and/or a redeemable certificate expiration date has not been reached. If the previously generated redeemable certificate data is valid, the redeemable certificate validation module 520 can issue a redeemable certificate acceptance, approval, authorization, or validation code to the POS machine 100 under consideration, and designate this redeemable coupon data as used/redeemed in the POS transaction database 401. Otherwise, the redeemable certificate validation module 520 can issue a redeemable certificate invalidity/expired code to the POS machine 100 under consideration.

With respect to the POS transaction summary data received from any given POS machine 100, the adjunctive POS transaction data generation/retrieval module 530 is configured for analyzing the POS transaction summary data and individual POS transaction data contained therein, and examining rules configured in the POS transaction database 401 to determine whether any new redeemable certificate data (e.g., voucher/coupon/special offer data) is to be linked with any individual POS transaction and/or the overall POS transaction currently under consideration. New redeemable certificate data can be either generated then inserted into the POS transaction database 401, or the redeemable certificate data can be previously imported from an external system and marked or flagged as not being issued/linked to any previous transaction. If new redeemable certificated data is to be linked with an individual or the overall POS transaction under consideration, the adjunctive POS transaction data generation/retrieval module 530 retrieves the relevant new redeemable certificate data from the POS transaction database 401, and subsequently sends a set or aggregation of such new redeemable certificate data to the POS machine 100 under consideration as adjunctive POS transaction data.

The POS transaction data analysis and reporting module 540 is configured for selectively or selectably analyzing (e.g., statistically analyzing) parsed/processed POS transaction related data stored in the POS transaction database 401 in accordance with particular criteria (e.g., selectable, programmable, and/or customizable criteria), and generating various types of report data and/or reports based upon such analyses. Such report data/reports can contain information useful or relevant to product manufacturers, product distributors/suppliers, product marketers, business owners, business landlords, government agencies, card payment services, loyalty/rewards services, and/or other parties. The POS transaction data analysis and reporting module 540 can store the results of its analyses in the POS transaction database 401, and can further selectively transfer or make particular types of report data/reports available to external systems/devices such as seller electronic/computing devices 610, loyalty/rewards systems 620, CRM systems 630, third party POS transaction information consumer systems, subsystems, or devices 640, and/or other external electronic/computing systems, subsystems, or devices 650.

The business owner/seller module 550 is configured for performing seller management processes or operations, by which product and/or service sellers can interact with the POS transaction data management server 400 to specify, define, select, and/or customize (a) one or more types of adjunctive POS transaction data, and possibly (b) a manner in which certain adjunctive POS transaction data is to be included or combined with POS transaction summary data in association with the generation of final POS transaction receipt data.

The purchaser management module 560 is configured for performing purchaser management processes or operations. As part of such operations, purchasers can selectively (e.g., optionally/voluntarily) associate themselves with particular completed POS purchase transactions by way of purchaser interaction with a purchaser application program or app executing on a purchaser electronic/computing device 600. The purchaser app can communicate (a) purchaser information such as a purchaser ID (e.g., a purchaser e-mail address/mobile telephone number), and (b) the QR code or other type of machine-readable code that was generated or provided as part of a given final POS transaction receipt to the purchaser management module 550. The purchaser management module 550 can maintain a purchaser database within the POS transaction database 401. By way of the purchaser app, the purchaser management module 550, and the purchaser database, a purchaser can selectively communicate 5 records of their purchases to particular businesses and/or loyalty/rewards programs, and can track their POS transaction histories and/or product/service buying patterns.

The loyalty/rewards management module 570 can be configured for data communication with each loyalty/rewards system 620; the CRM management module 580 can be configured for data communication with each CRM system 630; and each third party POS transaction information consumer management module 590 can be configured for data communication with a given third party POS transaction data consumer system, subsystem, or device 640, in a manner that supports or enables the functionality provided by such systems 620, 630, 640. Other types of management modules (not shown) within the memory 500 can be configured for data communication with particular types of external electronic/computing systems or devices, for instance, which correspond to different or distinct categorical types of external users of POS transaction related information.

Figure 4:
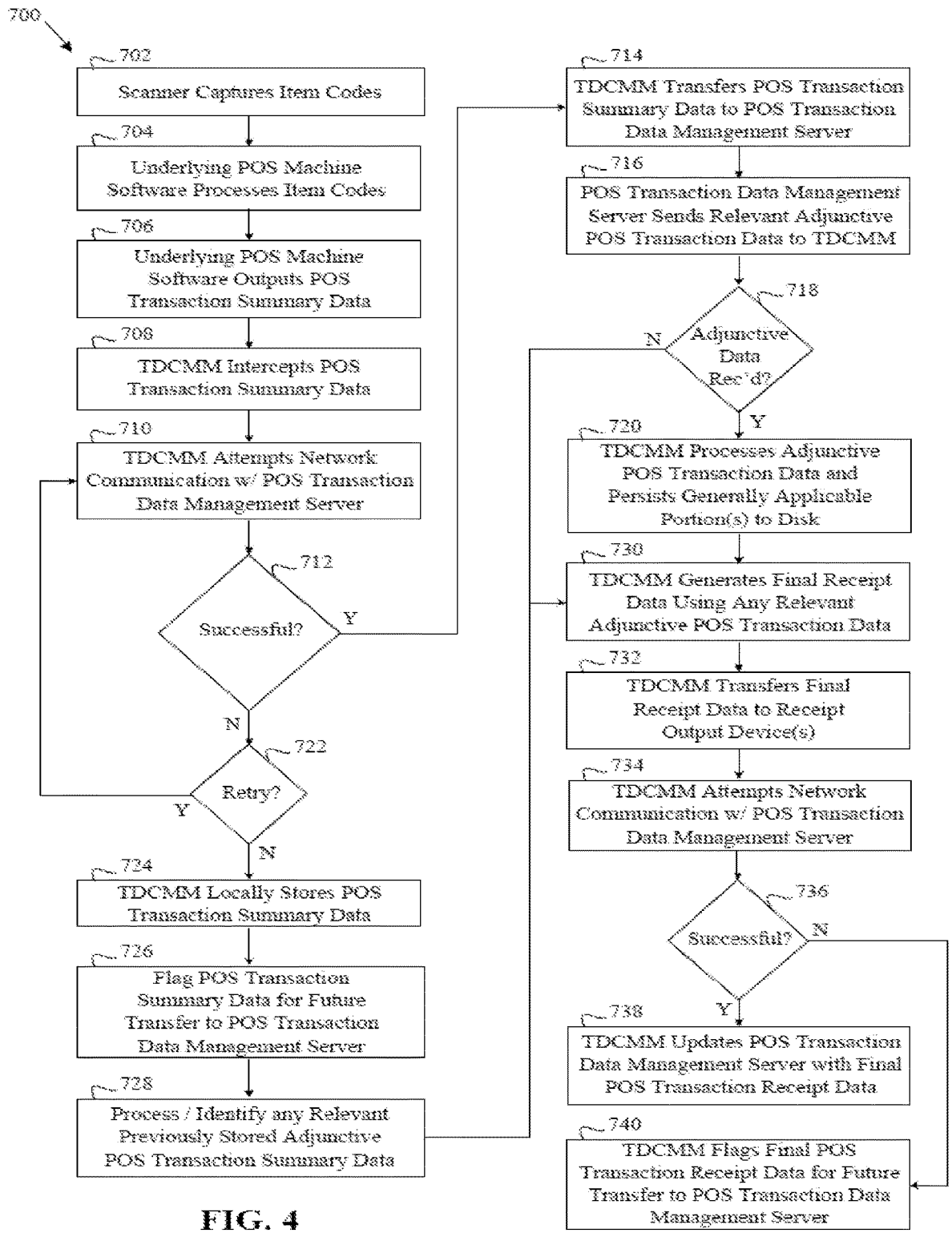
FIG. 4 is a flow diagram of a representative process for capturing and processing POS transaction summary data in accordance with a non-limiting representative embodiment of the present disclosure.

Representative Aspects of POS Transaction Data Capture and Processing Operations FIG. 4 is a flow diagram of a representative process 700 for capturing and processing POS transaction summary data in accordance with a representative embodiment of the present disclosure. Such a process 700 can be performed (e.g., concurrently) for each POS machine 100 within a set of POS machines 100 under consideration (e.g., one to many hundreds or thousands of POS machines 100), where each POS machine 100 is communicatively coupled to or enhanced with a TDCMM 300 in accordance with an embodiment of the present disclosure.

In an embodiment, the process 700 includes a first process portion 702 involving capturing a set of machine-readable codes (e.g., barcodes and/or QR codes) by a scanner 120 coupled to a given POS machine 100 during a product and/or service purchase situation, interaction, or event. Each such machine readable code can correspond to or identify a particular product or service that a purchaser is buying. The process 700 further includes a second process portion 704 involving receiving and processing the captured machine-readable code(s) by this POS machine's underlying POS software 210, which determines or associates product or service price information with each machine readable code as part of its generation of POS transaction summary data. A third process portion 706 involves the underlying POS software 210 outputting POS transaction summary data corresponding to these processed machine-readable code(s) (e.g., where the POS transaction summary data corresponds to or represents a completed purchase transaction, for which purchase payment by the purchaser has successfully occurred, but for which an individual receipt has not yet been generated) toward one or more receipt generation device drivers 240 and/or receipt generation device output ports 250. The first, second, and third process portions 702, 704 involve conventional operations, in a manner readily understood by individuals having ordinary skill in the art. Such individuals will further understand that the first process portion 702 can additionally or alternatively involve manual entry of certain product and/or service data into the POS machine 100 by way of cashier interaction with a POS machine input device 104.

After the underlying POS machine software 210 outputs the POS transaction summary data, a fourth process portion 708 involves the capture or interception of the POS transaction summary data by the TDCMM 300 corresponding to the POS machine 100 under consideration, such that prior to the capture or interception of such POS transaction summary data by the TDCMM 300, the POS transaction summary data is not communicated to the receipt generation device output port(s) 250 to which the underlying POS machine software 210 directed or routed the POS transaction summary data. Thus, the TDCMM 300 prevents the POS transaction summary data from being transferred from the underlying POS machine software 210 to one or more receipt generation output devices 150 without the capture, interception, or intermediary acquisition of the POS transaction summary data by the TDCMM 300 itself.

In a fifth process portion 710, the TDCMM 300 attempts to establish network communication with the POS transaction data management server 400. In a sixth process portion 712, the TDCMM 300 determines whether network communication with the POS transaction data management server 400 has been successfully established. If network communication has been successfully established, a seventh process portion 714 involves the TDCMM's transfer of the intercepted POS transaction summary data under consideration (e.g., the most-recently intercepted POS transaction summary data) to the POS transaction data management server 400. In an eighth process portion 716, the POS transaction data management server 400 processes and sends relevant adjunctive POS transaction data, if any to the TDCMM 300 under consideration, and in a ninth process portion 718 the TDCMM determines whether relevant adjunctive POS transaction data was sent by POS transaction data management server 400 for the POS transaction summary data under consideration. If so, in a tenth process portion 720 the TDCMM process such adjunctive POS transaction data and persists part or all of the adjunctive POS transaction data that is generically applicable to all other POS transaction data, such that these generally applicable data can be used in an offline manner (e.g., by adding generally applicable adjunctive data to POS transaction summary data under consideration when network communication with the POS transaction data management server 400 is not available).

In the event that network communication could not be successfully established in association with the fifth and sixth process portions 710, 712, in an eleventh process portion 722 the TDCMM 300 determines whether to retry establishing network communication with the POS transaction data management server 400 (e.g., in the event that a maximum number of retry attempts has not been exceeded, or a timeout limit has not been reached). If so, the process 700 returns to the fifth process portion 710. Otherwise, in a twelfth process portion 724, the TDCMM 300 locally stores (e.g., in a particular memory space/region or buffer, and/or persists to disk storage using the data storage unit 108) the POS transaction summary data currently under consideration, and in a thirteenth process portion 726 the TDCMM 300 marks or flags this locally stored POS transaction summary data as requiring future transfer to the POS transaction data management server 400. In a fourteenth process portion 728, the TDCMM 300 processes any available previously stored adjunctive POS transaction data received from POS transaction data management server (for example, a seller logo previously received from the POS transaction data management server 400) that is relevant to the current POS transaction summary data if relevant or necessary. In various embodiments, the flow of process portions 714, 716, 718 and 720 (which can be defined as online process portions) can occur in an asynchronous manner with respect to the flow of process portion 728 (which can be defined as an offline process portion). In another words, the processing/identification of any relevant previously stored adjunctive POS transaction summary data in offline process portion 728 can occur at the same time that online process portions 714, 716, 718, and 720 are being performed.

After (a) the tenth process portion 720 in the event that the TDCMM 300 had communicated the POS transaction summary data to the POS transaction management server 400 and received adjunctive POS transaction data in response, or (b) the ninth process portion 718 in the event that the TDCMM 300 had communicated the POS transaction summary data to the POS transaction management server 400 and did not receive adjunctive POS transaction data in response, or (c) the fourteenth process portion 728 in the event that the TDCMM 300 was unable to establish network communication with the POS transaction management server 400, in a fifteenth process portion 730 the TDCMM 300 generates or assembles final POS transaction receipt data, based on or using the POS transaction summary data currently under consideration, and any relevant adjunctive POS transaction data. In some embodiments, the TDCMM 300 generates or assembles the final POS transaction receipt data using (a) the POS transaction summary data currently under consideration; and (b) one or each of (i) particular adjunctive POS transaction data, such as first adjunctive POS transaction data, that the TDCMM 300 most-recently received from the POS transaction data management server 400 as a result of the POS transaction data management server 400 parsing/processing the POS transaction summary data currently under consideration and returning corresponding adjunctive POS transaction data to the TDCMM 300; and (ii) additional or other adjunctive POS transaction data, such as second or generally applicable adjunctive POS transaction data, that locally resides in the POS machine's memory 200 and/or data storage unit 108, which the TDCMM 300 need not have most-recently received or did not most-recently received from the POS transaction data management server 400, for instance, because the TDCMM 300 need only receive such adjunctive POS transaction data on a periodic, less frequent, or relatively infrequent basis (e.5 g., only after such adjunctive data changes, which can occur one or more times times per month, week, or day), or because the TDCMM 300 was unable to successfully establish network communication with the POS transaction data management server 400.

As a representative non-limiting example, the first adjunctive POS transaction summary data can include or be POS transaction specific data (e.g., new redeemable certificate data) corresponding to one or more specific products/services, one or more product/service quantities, and/or an amount spent identified in the POS transaction summary data currently under consideration; and the second adjunctive POS transaction summary data can include non-product specific/non-service specific data, such as more general data indicating one or more of a business marketing message (e.g., corresponding to a seasonal, monthly, or weekly promotional event), a business name, a business logo, a business address, business contact information, current business operating hours, and a set of images or pictures. The first adjunctive POS transaction data can be defined as dynamic adjunctive POS transaction data, the data content of which can change, vary, or depend upon one or more specific POS transactions identified within POS transaction summary data that corresponds to a current or most-recent set of POS transactions being handled by the POS machine 100 under consideration. The second adjunctive POS transaction data can be defined as semi-static or less dynamic adjunctive POS transaction data, the data content of which can be derived based on the specific POS transactions identified within this POS transaction summary data and the adjunctive data that is locally available. As indicated above, the second adjunctive POS transaction data is typically locally available to the TDCMM 300 prior to the TDCMM's communication of captured POS transaction summary data to the remote POS transaction data management server 400.

In generating or assembling the final POS transaction receipt data, the TDCMM 300 can append or prepend certain adjunctive POS transaction data to the POS transaction summary data, and/or distribute or intersperse one or more portions of the adjunctive POS transaction data between or within portions of the POS transaction summary data.

In a sixteenth process portion 732, the TDCMM 300 communicates, transfers, or outputs the final POS receipt data to the receipt generation device(s) 150 to which the underlying POS software 100 originally directed or intended to direct the POS transaction summary data. Such receipt generation device(s) 150 correspondingly generate, present, or output an appropriate type of receipt, in a manner readily understood by individuals having ordinary skill in the relevant art. In a seventeenth process portion 734, the TDCMM 300 attempts to establish network communication with POS transaction data management server 400. In an eighteenth process portion 736, the TDCMM 300 determines whether network communication with POS transaction data management server 400 has been successfully established. If network communication has been successfully established, in a nineteenth process portion 738 involves the TDCMM's updating POS transaction data management server with the final receipt data. Otherwise, in the event that network communication could not be successfully established in association with the seventeenth and eighteenth process portions 734, 736, in a twentieth process portion 740 the TDCMM stores the final receipt data locally and marks or flags this stored final receipt data as requiring future transfer to the POS transaction data management server 400.

Figure 5:
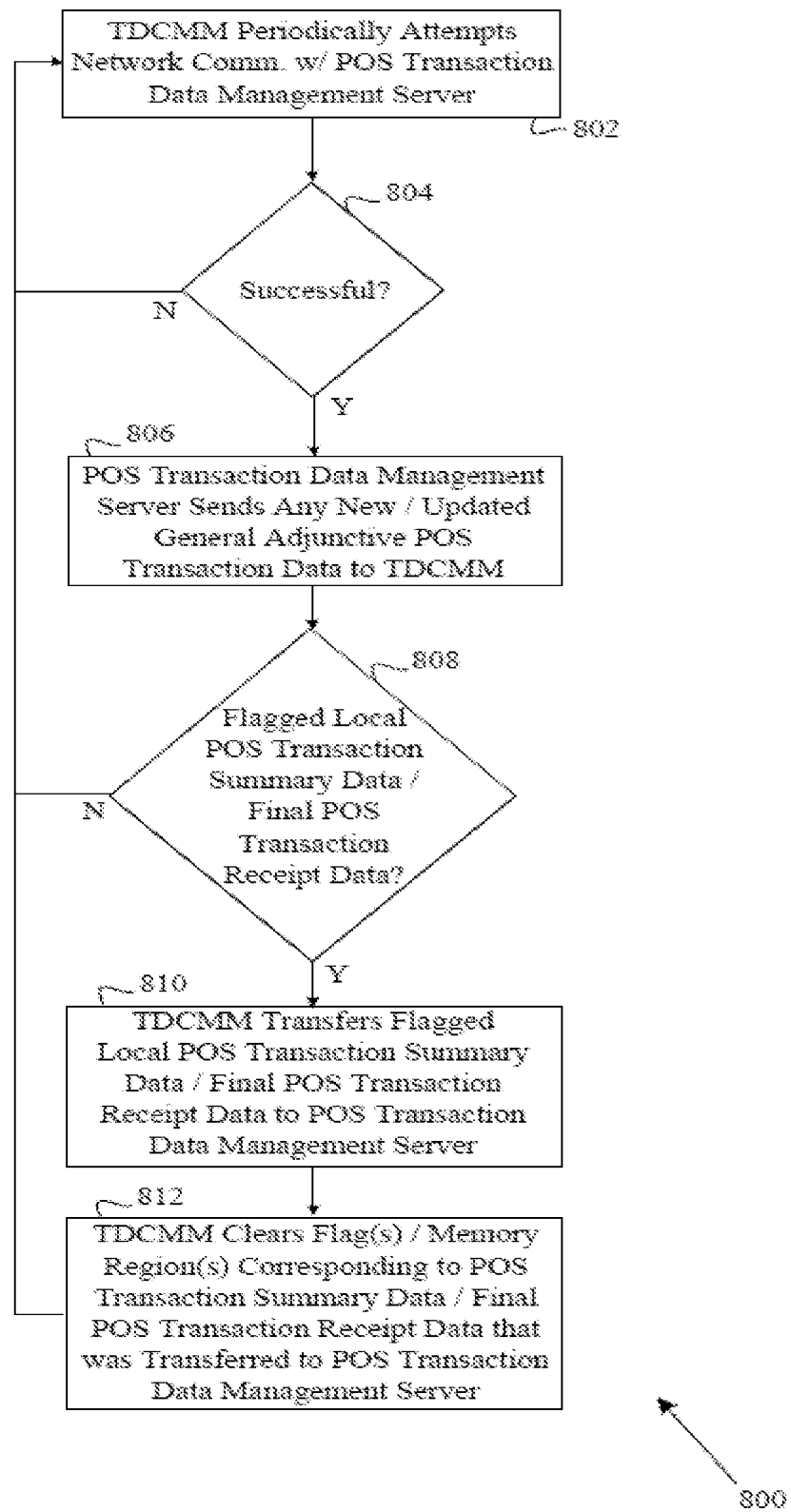
FIG. 5 is a flow diagram of a process for communicating flagged POS transaction summary data to the POS transaction data management server in accordance with a representative embodiment of the present disclosure.

FIG. 5 is a flow diagram of a process 800 illustrating aspects of periodic communication between a given TDCMM 300 and the POS transaction data management server 400 in accordance with a representative embodiment of the present disclosure. In an embodiment, the process 800 includes a first process portion 802 involving the TDCMM attempting to establish communication with the POS transaction data management server 400 on a periodic or scheduled basis, and a second process portion 804 involving TDCMM determination of whether such communication is successful. If not, the process 800 can return to the first process portion 802.

If communication is successful, a third process portion 806 involves the transfer of any new or updated generally applicable adjunctive POS transaction data from the POS transaction data management server 400 to the TDCMM 300 under consideration. A fourth process portion 808 involves TDCMM determination of whether locally-stored flagged POS transaction summary data/final receipt data corresponding to one or more completed POS transaction sequences exists (e.g., within a memory space/region or buffer, or a data storage unit location or file used or reserved for storing such flagged data). Such flagged POS transaction summary data/final receipt data includes or is POS transaction summary data/POS final receipt data that has not yet successfully been communicated or transferred/updated to the POS transaction data management server 400. If no such locally resident flagged data exists, the process 800 can remain at the first process portion 802. If flagged POS transaction summary data/final receipt data exists, a fifth process portion 810 involves the TDCMM communication or transfer of currently flagged POS transaction summary data/final receipt data to the POS transaction data management server 400. After the fifth process portion 810, in a sixth process portion 812 the TDCMM 300 un-flags or deletes the most-recently flagged POS transaction summary data/final receipt data that has been communicated to the POS transaction data management server 400 (e.g., by partially or completely clearing the aforementioned memory space/region or buffer), after which the process 800 can return to the first process portion 802.

Representative Aspects of Redeemable Certificate Processing

The processing, authorization, or validation of redeemable certificates is also transparent with respect to the POS machine underlying software 210 (e.g., the POS machine underlying software is configured to perform its normal or standard POS transaction summary data generation operations, and is not or need not be modified for receiving, processing, authorizing, or validating redeemable certificate data), and can be performed automatically by way of communication between the TDCMM 300 and the POS transaction management server 400, e.g., without involvement by the POS machine underlying software 210. More particularly, in various embodiments the TDCMM 300 is able to (a) access, monitor, and/or allow data entry/receive data entered from an input device such as a scanner 120 and/or another type of input device (e.g., a keyboard) that can capture the machine-readable code(s) or data corresponding thereto on redeemable certificates; and (b) examine or determine what input the scanner 120 and/or other input device has captured/provided (e.g., the TDCMM 300 can "listen" to the scanner's captured input, in a manner readily understood by individuals having ordinary skill in the relevant art). In the event that the TDCMM 300 determines that a redeemable certificate has been scanned (e.g., because the scanner 120 has captured a machine-readable code corresponding thereto) and/or redeemable certificate data has been input, the TDCMM 300 obtains, intercepts, or captures the machine-readable redeemable certificate code and/or redeemable certificate data under consideration, and communicates this machine readable code and/or redeemable certificate data to the POS transaction data management server 400 such that the POS transaction management server 400 can authorize or validate the redeemable certificate (or deny authorization or validation thereof).

The POS transaction management server 400 checks the POS transaction database 401 to identify the machine-readable code and/or redeemable certificate data received from the TDCMM 300, and determines redeemable certificate details corresponding thereto, where such details can include product/brand name information, price adjustment amount, validity period, and whether the redeemable certificate has been previously used. If the redeemable certificate has not expired, has not been previously used, and applies to or matches a product/service purchase in the context of POS transaction summary data that has most-recently been received from the TDCMM 300, the POS transaction data management server 400 authorizes or approves the redeemable certificate by returning a corresponding authorization or approval code to the TDCMM 300. The POS transaction data management server 400 can additionally return corresponding price adjustment data to the TDCMM 300, if the TDCMM 300 has not already obtained or determined such data from the captured redeemable certificate data. Once the redeemable certificate under consideration has been authorized, the POS transaction server 400 marks or flags the machine-readable code and/or redeemable certificate data corresponding to this redeemable certificate as "used." After receiving the authorization code from the POS transaction data management server 400, the TDCMM 300 can generate a physical or electronic authorization slip corresponding to the now-redeemed certificate. The process of validation/authorization of a redeemable certificate, in a manner readily understood by individuals having ordinary skill in the art, can involve a confirmation process where the POS transaction data management server 400 can first respond to a redeemable certificate query issued by a TDCMM with details related to the redeemable 5 certificate under consideration, such as a description, an amount, a validity period, and any other relevant details for confirmation. The authorization/validation process as described above can be performed upon confirmation.

Aspects of particular embodiments of the present disclosure address at least one aspect, problem, limitation, and/or disadvantage associated with existing manners of capturing, processing, managing, and analyzing POS transaction data. While features, aspects, and/or advantages associated with certain embodiments have been described in the disclosure, other embodiments may also exhibit such features, aspects, and/or advantages, and not all embodiments need necessarily exhibit such features, aspects, and/or advantages to fall within the scope of the present disclosure and the claims below. It will be appreciated by a person of ordinary skill in the art that several of the above-disclosed systems, devices, machines, elements, processes, or alternatives thereof can be combined into other different systems, devices, machines, elements, processes, and/or applications. In addition, a person of ordinary skill in the art can make various modifications, alterations, and/or improvements to embodiments disclosed herein, where such modifications, alterations, and/or improvements fall within the scope of the present disclosure and the following claims.

Figure 6:
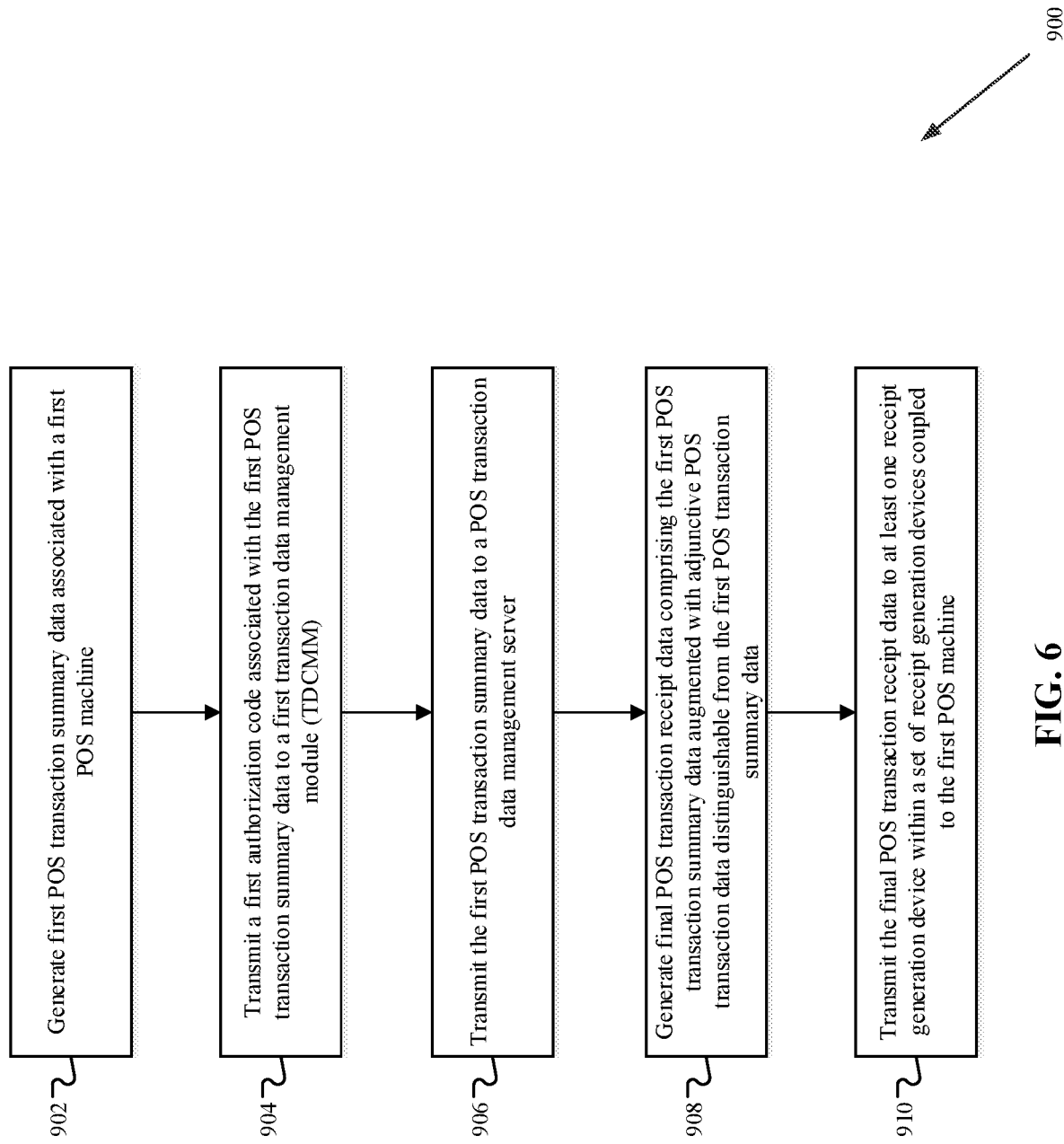
FIG. 6 is a flowchart illustrating an example of a computer-implemented method for communicating flagged POS transaction summary data to the POS transaction data management server, according to an implementation of the present disclosure.

FIG. 6 is a flowchart illustrating an example of a computer-implemented method 900 for communicating flagged POS transaction summary data to the POS transaction data management server, according to an implementation of the present disclosure, according to an implementation of the present disclosure. For clarity of presentation, the description that follows generally describes method 900 in the context of the other figures in this description. However, it will be understood that method 900 can be performed, for example, by any system, environment, software, and hardware, or a combination of systems, environments, software, and hardware, as appropriate. In some implementations, various steps of method 900 can be run in parallel, in combination, in loops, or in any order.

At 902, first POS transaction summary data associated with a first POS machine is generated. In some implementations, the first POS transaction summary data comprises statistical information generated from one or more POS transaction sequences. In some implementations, the first POS transaction summary data is further associated with an item code comprising a Quick Response code. From 902, method 900 proceeds to 904.

At 904, a first authorization code associated with the first POS transaction summary data is transmitted to a first transaction data management module (TDCMM). From 904, method 900 proceeds to 906.

At 906, the first POS transaction summary data is transmitted to a POS transaction data management server. From 906, method 900 proceeds to 908.

At 908, final POS transaction receipt data is generated, where the final POS transaction receipt data comprises the first POS transaction summary data augmented with adjunctive POS transaction data distinguishable from the first POS transaction summary data. From 908, method 900 proceeds to 910.

At 910, the final POS transaction receipt data is transmitted to at least one receipt generation device within a set of receipt generation devices coupled to the first POS machine. After 910, method 900 can stop.

In some implementations, method 900 can further comprise producing at least one of a paper receipt and an e-receipt corresponding to the final POS transaction receipt data by way of the at least one receipt generation device, to which the final POS transaction receipt data was communicated.

In some implementations, method 900 can further comprise: 1) identifying first adjunctive POS transaction data, wherein data content of the first adjunctive POS transaction data is dependent upon one or more POS transactions identified within the first POS transaction summary data and 2) communicating the first adjunctive POS transaction data to the first TDCMM, wherein the adjunctive POS transaction data of the final POS transaction receipt data comprises the first adjunctive POS transaction data.

In some implementations, method 900 can further comprise identifying second adjunctive POS transaction summary data relevant to the first POS transaction summary data, wherein the second adjunctive POS transaction summary data locally resides in one of the memory of the first POS machine and a data storage unit thereof prior to communication or attempted communication of the first POS transaction summary data to the POS transaction data management server, and wherein the adjunctive POS transaction data of the final POS transaction receipt data comprises the second adjunctive POS transaction data. In these implementations, the second adjunctive data can comprise at least one of a business name, a business logo, a business operating schedule corresponding to a business at which the first POS machine is located, a promotional or an advertising message, and a set of images.

In some implementations, method 900 can further comprise: 1) receiving first redeemable certificate data corresponding to a first redeemable certificate presented by a buyer in association with a current set of POS purchase transactions, wherein the first redeemable certificate data was captured or input by a first input device coupled to the first POS machine; 2) transmitting the first redeemable certificate data to the POS transaction data management server; 3) validating the first redeemable certificate data by the POS transaction data management server; and 4) returning the first authorization code corresponding to the first redeemable certificate data. In these implementations, the first redeemable certificate data can be validated by the POS transaction data management server by determining whether the first redeemable certificate data is valid or expired.

In some implementations, method 900 can further comprise: 1) capturing with the first TDCMM second POS transaction summary data, the second POS transaction summary data comprising reporting data corresponding to multiple distinct sequences of POS transactions handled by the first POS machine across separate purchase transactions with respect to a particular time period and 2) transmitting the second POS transaction summary data to the POS transaction data management server.

In some implementations, method 900 can further comprise: 1) providing a POS transaction database accessible to the POS transaction data management server, wherein the POS transaction database stores historical POS transaction data corresponding to POS transaction summary data received from one or more TDCMMs; 2) analyzing the historical POS transaction data in accordance with particular criteria; and 3) transmitting results corresponding to an analysis of historical POS transaction data to one or more external computing systems or devices. In these implementations, the external computing systems or devices can comprise one or more of a seller electronic, a computing device, a loyalty system, a reward system, a customer relationship management system, a third-party POS transaction information consumer system, a third-party POS transaction information consumer subsystem, a third-party POS transaction information consumer device, a payment system, a data analytics system, and a credit scoring system.

In some implementations, method 900 can further comprise: 1) determining whether the final POS transaction receipt data is locally-stored and flagged and 2) in response to determining that the final POS transaction receipt data is locally-stored and flagged, transmitting the final POS transaction receipt data from the first TDCMM to at least one receipt generation device within the set of receipt generation devices coupled to the first POS machine.

The described subject matter provides one or more technical effects/advantages over conventional methods for communicating POS transaction summary data to a POS transaction data management server. For example, multiple POS machines, which can include technologically different POS machines (e.g., different POS machine brands or models), can each be augmented or equipped with POS transaction data capture and management software, without requiring any modification to as-manufactured POS machine software or hardware. Each POS transaction data capture and management module can be configured for intercepting or capturing POS transaction related data directed to one or more output ports or output devices of its corresponding POS machine; and communicating captured POS transaction related data to a remote POS transaction data storage, processing, management, and/or analysis server. The described subject matter allows for reduction of delays in completion of POS transaction sequences and protection of user (for example, purchaser) data privacy through reduction in a need for the user to interact directly with a POS system. The reduction in interaction requirements reduces the potential points in which the user's data can be compromised.

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

What is claimed is:

1. A computer-implemented method for point-of-sale (POS) transaction data management, comprising:
    intercepting, directly by a first transaction data management module (TDCMM) of a first POS machine, first POS transaction summary data associated with the first POS machine, wherein the first TDCMM is software installed on the first POS machine and executed by one or more processors of the first POS machine, and the first POS transaction summary is intercepted without using a port of the first POS machine;
    receiving, directly by the first TDCMM, first redeemable certificate data corresponding to a first redeemable certificate presented by a buyer in association with the first POS transaction summary data;
    transmitting, directly by the first TDCMM, the first redeemable certificate data to a POS transaction data management server;
    receiving, directly by the first TDCMM, a first authorization code corresponding to the first redeemable certificate data, wherein the first redeemable certificate data is validated by the POS transaction data management server to generate the first authorization code;
    transmitting, directly by the first TDCMM the first POS transaction summary data to the POS transaction data management server;
    receiving, directly by the first TDCMM, adjunctive POS transaction data identified based on the first POS transaction summary data from the POS transaction data management server;
    generating, directly by the first TDCMM, final POS transaction receipt data based on the first POS transaction summary data, the first authorization code, and the adjunctive POS transaction data, wherein the final POS transaction receipt data comprises the first POS transaction summary data augmented with the adjunctive POS transaction data distinguishable from the first POS transaction summary data; and
    transmitting, directly by the first TDCMM the final POS transaction receipt data to at least one receipt generation device within a set of receipt generation devices coupled to the first POS machine.

2. The computer-implemented method of claim 1, wherein the first POS transaction summary data comprises statistical information generated from one or more POS transaction sequences.

3. The computer-implemented method of claim 1, wherein the first POS transaction summary data is further associated with an item code comprising a Quick Response code.

4. The computer-implemented method of claim 1, further comprising producing at least one of a paper receipt and an e-receipt corresponding to the final POS transaction receipt data by way of the at least one receipt generation device, to which the final POS transaction receipt data was communicated.

5. The computer-implemented method of claim 1, further comprising:
identifying first adjunctive POS transaction data, wherein data content of the first adjunctive POS transaction data is dependent upon one or more POS transactions identified within the first POS transaction summary data; and
communicating the first adjunctive POS transaction data to the first TDCMM, wherein the adjunctive POS transaction data of the final POS transaction receipt data comprises the first adjunctive POS transaction data.

6. The computer-implemented method of claim 5, further comprising:
identifying, by the first TDCMM, second adjunctive POS transaction summary data relevant to the first POS transaction summary data, wherein the second adjunctive POS transaction summary data locally resides in memory of the first POS machine and a data storage unit thereof prior to communication or attempted communication of the first POS transaction summary data to the POS transaction data management server, and wherein the adjunctive POS transaction data of the final POS transaction receipt data comprises the second adjunctive POS transaction data.

7. The computer-implemented method of claim 6, wherein the second adjunctive data comprises at least one of a business name, a business logo, a business operating schedule corresponding to a business at which the first POS machine is located, a promotional or an advertising message, and a set of images.

8. The computer-implemented method of claim 1, wherein the first redeemable certificate data was captured or input by a first input device coupled to the first POS machine.

9. The computer-implemented method of claim 8, wherein the first redeemable certificate data is validated by determining whether the first redeemable certificate data is valid or expired.

10. The computer-implemented method of claim 1, further comprising:
capturing, by the first TDCMM, second POS transaction summary data, the second POS transaction summary data comprising reporting data corresponding to multiple distinct sequences of POS transactions handled by the first POS machine across separate purchase transactions with respect to a particular time period; and
transmitting, by the first TDCMM, the second POS transaction summary data to the POS transaction data management server.

11. The computer-implemented method of claim 1, further comprising:
providing a POS transaction database accessible to the POS transaction data management server, wherein the POS transaction database stores historical POS transaction data corresponding to POS transaction summary data received from one or more TDCMMs;
analyzing the historical POS transaction data in accordance with particular criteria; and
transmitting results corresponding to an analysis of historical POS transaction data to one or more external computing systems or devices.

12. The computer-implemented method of claim 11, wherein the one or more external computing systems or devices comprise one or more of a seller electronic, a computing device, a loyalty system, a reward system, a customer relationship management system, a third-party POS transaction information consumer system, a third-party POS transaction information consumer subsystem, a third-party POS transaction information consumer device, a payment system, a data analytics system, and a credit scoring system.

13. The computer-implemented method of claim 1, further comprising:
determining, by the first TDCMM, whether the final POS transaction receipt data is locally-stored and flagged; and
in response to determining that the final POS transaction receipt data is locally-stored and flagged, transmitting, by the first TDCMM, the final POS transaction receipt data from the first POS machine to the at least one receipt generation device within the set of receipt generation devices coupled to the first POS machine.

14. A non-transitory computer-readable storage medium coupled to one or more processors and having instructions stored thereon which, when executed by the one or more processors, cause the one or more processors to perform operations for point-of-sale (POS) transaction data management, the operations comprising:
intercepting, directly by a first transaction data management module (TDCMM) of a first POS machine, first POS transaction summary data associated with the first POS machine, wherein the first TDCMM is software installed on the first POS machine and executed by one or more processors of the first POS machine, and the first POS transaction summary is intercepted without using a port of the first POS machine;
receiving, directly by the first TDCMM, first redeemable certificate data corresponding to a first redeemable certificate presented by a buyer in association with the first POS transaction summary data;
transmitting, directly by the first TDCMM, the first redeemable certificate data to a POS transaction data management server;
receiving, directly by the first TDCMM, a first authorization code corresponding to the first redeemable certificate data, wherein the first redeemable certificate data is validated by the POS transaction data management server to generate the first authorization code;
transmitting, directly by the first TDCMM first POS transaction summary data to the POS transaction data management server;
receiving, directly by the first TDCMM, adjunctive POS transaction data identified based on the first POS transaction summary data from the POS transaction data management server;
generating, directly by the first TDCMM final POS transaction receipt data based on the first POS transaction summary data, the first authorization code, and the adjunctive POS transaction data, wherein the final POS transaction receipt data comprises the first POS transaction summary data augmented with the adjunctive POS transaction data distinguishable from the first POS transaction summary data; and
transmitting, directly by the first TDCMM the final POS transaction receipt data to at least one receipt generation device within a set of receipt generation devices coupled to the first POS machine.

15. The non-transitory computer-readable storage medium of claim 14, the operations further comprising:

identifying first adjunctive POS transaction data, wherein data content of the first adjunctive POS transaction data is dependent upon one or more POS transactions identified within the first POS transaction summary data;

communicating the first adjunctive POS transaction data to the first TDCMM, wherein the adjunctive POS transaction data of the final POS transaction receipt data comprises the first adjunctive POS transaction data; and identifying, by the first TDCMM, second adjunctive POS transaction summary data relevant to the first POS transaction summary data, wherein the second adjunctive POS transaction summary data locally resides in memory of the first POS machine and a data storage unit thereof prior to communication or attempted communication of the first POS transaction summary data to the POS transaction data management server, and wherein the adjunctive POS transaction data of the final POS transaction receipt data comprises the second adjunctive POS transaction data.

16. The non-transitory computer-readable storage medium of claim 14, wherein the first redeemable certificate data was captured or input by a first input device coupled to the first POS machine.

17. The non-transitory computer-readable storage medium of claim 14, the operations further comprising:

capturing, by the first TDCMM, second POS transaction summary data, the second POS transaction summary data comprising reporting data corresponding to multiple distinct sequences of POS transactions handled by the first POS machine across separate purchase transactions with respect to a particular time period; and transmitting, by the first TDCMM, the second POS transaction summary data to the POS transaction data management server.

18. The non-transitory computer-readable storage medium of claim 14, the operations further comprising:

providing a POS transaction database accessible to the POS transaction data management server, wherein the POS transaction database stores historical POS transaction data corresponding to POS transaction summary data received from one or more TDCMMs;

analyzing the historical POS transaction data in accordance with particular criteria; and transmitting results corresponding to an analysis of historical POS transaction data to one or more external computing systems or devices.

19. The non-transitory computer-readable storage medium of claim 14, the operations further comprising:

determining, by the first TDCMM, whether the final POS transaction receipt data is locally-stored and flagged; and in response to determining that the final POS transaction receipt data is locally-stored and flagged, transmitting, by the first TDCMM, the final POS transaction receipt data from the first POS machine to the at least one receipt generation device within the set of receipt generation devices coupled to the first POS machine.

20. A computer implemented system comprising:

a computing device; and a computer-readable storage device coupled to the computing device and having instructions stored thereon which, when executed by the computing device, cause the computing device to perform operations for point-of-sale (POS) transaction data management, the operations comprising:

intercepting, directly by a first transaction data management module (TDCMM) of a first POS machine, first POS transaction summary data associated with the first POS machine, wherein the first TDCMM is software installed on the first POS machine and executed by one or more processors of the first POS machine, and the first POS transaction summary is intercepted without using a port of the first POS machine;

receiving, directly by the first TDCMM, first redeemable certificate data corresponding to a first redeemable certificate presented by a buyer in association with the first POS transaction summary data;

transmitting, directly by the first TDCMM, the first redeemable certificate data to a POS transaction data management server;

receiving, directly by the first TDCMM, a first authorization code corresponding to the first redeemable certificate data, wherein the first redeemable certificate data is validated by the POS transaction data management server to generate the first authorization code;

transmitting, directly by the first TDCMM the first POS transaction summary data to the POS transaction data management server;

receiving, directly by the first TDCMM, adjunctive POS transaction data identified based on the first POS transaction summary data from the POS transaction data management server;

generating, directly by the first TDCMM, final POS transaction receipt data based on the first POS transaction summary data, the first authorization code, and the adjunctive POS transaction data, wherein the final POS transaction receipt data comprises the first POS transaction summary data augmented with the adjunctive POS transaction data distinguishable from the first POS transaction summary data; and transmitting, directly by the first TDCMM, the final POS transaction receipt data to at least one receipt generation device within a set of receipt generation devices coupled to the first POS machine.

* * * * *